(12) United States Patent
Xiao

(10) Patent No.: US 9,200,746 B2
(45) Date of Patent: Dec. 1, 2015

(54) INFANT SUPPORTING MECHANISM

(71) Applicant: Xiao-Hong Xiao, Guangdong (CN)

(72) Inventor: Xiao-Hong Xiao, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 126 days.

(21) Appl. No.: 14/017,329

(22) Filed: Sep. 4, 2013

(65) Prior Publication Data

US 2014/0061404 A1    Mar. 6, 2014

(30) Foreign Application Priority Data

Sep. 6, 2012   (CN) .......................... 2012 1 0328146
Jul. 1, 2013    (CN) .......................... 2013 1 0272314

(51) Int. Cl.
| | | |
|---|---|---|
| B62B 7/00 | (2006.01) | |
| A47D 13/00 | (2006.01) | |
| F16M 11/00 | (2006.01) | |
| B62B 9/10 | (2006.01) | |
| A47D 1/00 | (2006.01) | |
| A47D 9/00 | (2006.01) | |
| B62B 7/14 | (2006.01) | |
| A47D 13/02 | (2006.01) | |

(52) U.S. Cl.
CPC ................ *F16M 11/00* (2013.01); *A47D 1/006* (2013.01); *A47D 9/00* (2013.01); *B62B 7/142* (2013.01); *B62B 7/145* (2013.01); *B62B 9/10* (2013.01); *A47D 13/02* (2013.01); *A47D 13/025* (2013.01)

(58) Field of Classification Search
CPC .......... B62B 7/14; B62B 7/142; B62B 7/145; B62B 9/10; A47D 13/02; A47D 13/025; A47D 1/006; A47D 9/00; F16M 11/00

USPC ................. 248/146, 154, 221.11; 280/38, 47, 280/47.38, 47.4; 297/118, 130, 256.16, 297/183.2

See application file for complete search history.

(56) References Cited

U.S. PATENT DOCUMENTS

| | | | |
|---|---|---|---|
| 3,442,527 A | | 5/1969 | Gottfried et al. |
| 5,385,387 A | * | 1/1995 | Kain ......................... 297/256.16 |
| 5,398,951 A | * | 3/1995 | Ryu ................................. 280/30 |
| 5,567,008 A | * | 10/1996 | Cone, II .................... 297/256.16 |

(Continued)

FOREIGN PATENT DOCUMENTS

| | | |
|---|---|---|
| AU | 613668 | 8/1991 |
| AU | 2013101621 A4 | 1/2014 |
| DE | 10 2010 011 620 A1 | 9/2010 |
| EP | 1 163 868 A1 | 12/2001 |

(Continued)

*Primary Examiner* — Tan Le
(74) *Attorney, Agent, or Firm* — Winston Hsu; Scott Margo

(57) ABSTRACT

The present invention relates to an infant supporting mechanism detachably disposed on an infant carriage device and for detachably supporting an infant carrier. The supporting mechanism includes a main body, a first connecting component fixed on the main body, a second connecting component and a third connecting component. Apart of the second connecting component is disposed in the main body in a retractable manner, and the first connecting component and the second connecting component are for detachably supporting the infant carrier cooperatively. The first connecting component and the second connecting component are respectively disposed on the opposite sides of the main body. Apart of the third connecting component is movably disposed in the main body and detachably installed on the infant carriage device, and the third connecting component is disposed between the first connecting component and the second connecting component.

24 Claims, 28 Drawing Sheets

(56) References Cited

U.S. PATENT DOCUMENTS 6,017,088 A * 1/2000 Stephens et al. ......... 297/256.16
6,183,044 B1 * 2/2001 Koyanagi et al. ........ 297/256.16
6,695,400 B2 * 2/2004 Washizuka et al. ........... 297/130

FOREIGN PATENT DOCUMENTS

| EP | 2 289 762 A2 | 3/2011 |
| EP | 2 289 762 A3 | 8/2012 |
| GB | 2468767 A | 9/2010 |

* cited by examiner

INFANT SUPPORTING MECHANISM

BACKGROUND OF THE INVENTION

1. Field of the Invention

The present invention relates to an infant supporting mechanism, and more specifically, to an infant supporting mechanism detachably disposed on an infant carriage device and for detachably supporting an infant carrier.

2. Description of the Prior Art

An infant carriage device, such as a stroller, is a convenient baby care product for carrying a baby. Besides, an infant carrier, such as a baby cradle, a crib and a baby safety seat, is also a convenient baby care product for caring a baby. A conventional stroller includes a carriage body, which is a frame, a seat and wheels disposed on the carriage body. When moving a baby from the baby cradle, the crib or the baby safety seat to the seat of the stroller, a baby carrier needs to hold the baby out of the baby cradle, the crib or the baby safety seat and then to put the baby on the seat of the stroller. However, it is not only a strenuous job but also easy to disturb the baby. Therefore, it is necessary to provide an infant supporting mechanism for detachably supporting an infant carrier for solving the above drawbacks.

SUMMARY OF THE INVENTION

A purpose of the present invention is to provide a supporting mechanism with a simple structure, low cost, and capable of being easily assembled with or detached from an infant carrier or an infant carriage device.

The present invention is to provide a supporting mechanism detachably disposed on an infant carriage device and for detachably supporting an infant carrier. The supporting mechanism includes a main body, a first connecting component, a second connecting component, and a third connecting component. The first connecting component is fixed on the main body; a part of the second connecting component is disposed in the main body in a retractable manner, the first connecting component and the second connecting component are for detachably supporting the infant carrier cooperatively, and the first connecting component and the second connecting component are respectively disposed on the opposite sides of the main body; and a part of the third connecting component is movably disposed in the main body and detachably installed on the infant carriage device, and the third connecting component is disposed between the first connecting component and the second connecting component.

Preferably, the main body is formed as a rectangular frame.

Preferably, the first connecting component includes a first engaging portion fixed on the main body, and a sunken portion connected to the first engaging portion for engaging with the infant carrier.

Preferably, the second connecting component includes a second engaging portion fixed on the main body, and a pushing portion connected to the second engaging portion in a retractable manner for contacting against the infant carrier.

Specifically, the second connecting component further includes a resilient portion resiliently contacting the pushing portion so that the pushing portion continuously stretches out of the second engaging portion.

The pushing portion includes a first surface for contacting against the infant carrier, and an inclined second surface adjacent to the first surface according to an embodiment of the present invention.

Specifically, a distance between the first surface and the second surface is decreasing in a direction of that the pushing portion stretches out of the second engaging portion.

Preferably, the third connecting component includes a third engaging portion fixed on the main body, a tenon portion movably connected to the third engaging portion, and an operating portion connected to the tenon portion and for driving the tenon portion to selectively engage with or detach from the infant carriage device.

Specifically, the third connecting component further includes a restoring portion resiliently contacting the tenon portion for continuously moving the tenon portion to engage with the infant carriage device.

Specifically, the third connecting component further includes a restoring portion resiliently contacting the operating portion for continuously driving the tenon portion to move to engage with the infant carriage device.

The tenon portion is connected to the third engaging portion in a retractable manner according to an embodiment of the present invention.

Specifically, the tenon portion includes a first side contacting against the infant carriage device, and an inclined second side adjacent to the first side.

Specifically, a distance between the first side and the second side is decreasing in a direction away from a junction of the main body and the third engaging portion.

The tenon portion is pivotally connected to the third engaging portion according to an embodiment of the present invention.

Specifically, a quantity of the tenon portion is two, and the two tenon portions pivot in opposite directions.

Specifically, the two tenon portions form a clamp structure.

Preferably, the operating portion is pressed to drive the tenon portion to detach from the infant carriage device.

Preferably, the operating portion is released to drive the tenon portion to move to engage with the infant carriage device.

Preferably, the operating portion is slidably connected to the tenon portion.

Specifically, one of the operating portion and the tenon portion includes a sliding stick, and the other of the operating portion and the tenon portion includes a sliding slot in which the sliding stick is slidably inserted.

Specifically, an extending direction of the sliding slot and a sliding direction of the operating portion are intersected.

The operating portion is pivotally connected to the tenon portion according to an embodiment of the present invention.

The operating portion is slidably connected to the third engaging portion according to the embodiment of the present invention.

The operating portion is pivotally connected to the third engaging portion according to another embodiment of the present invention.

Specifically, the operating portion is pivotally connected to the tenon portion and the third engaging portion, and a pivotal joint of the operating portion and the tenon portion is different from a pivotal joint of the operating portion and the third engaging portion.

The supporting mechanism of the present invention includes the first connecting component fixed on the main body, the second connecting component partly disposed in the main body in the retractable manner, and the at least one third connecting component partly movably disposed in the main body. As for assembly, the infant carrier can be supported by the main body, and can be positioned by the first connecting component and the second connecting component cooperatively. The supporting mechanism can be detachably disposed on the infant carriage device by the third connecting component partly movably disposed on the main body. As for disassembly, a part of the second connecting component and a part of the third connecting component are movably disposed on the main body. The supporting mechanism, the infant carrier and the infant carriage device can be detached from each other by operating the second connecting component and the third connecting component. The supporting mechanism has advantages of a simple structure, convenient assembly and low cost.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention maybe practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
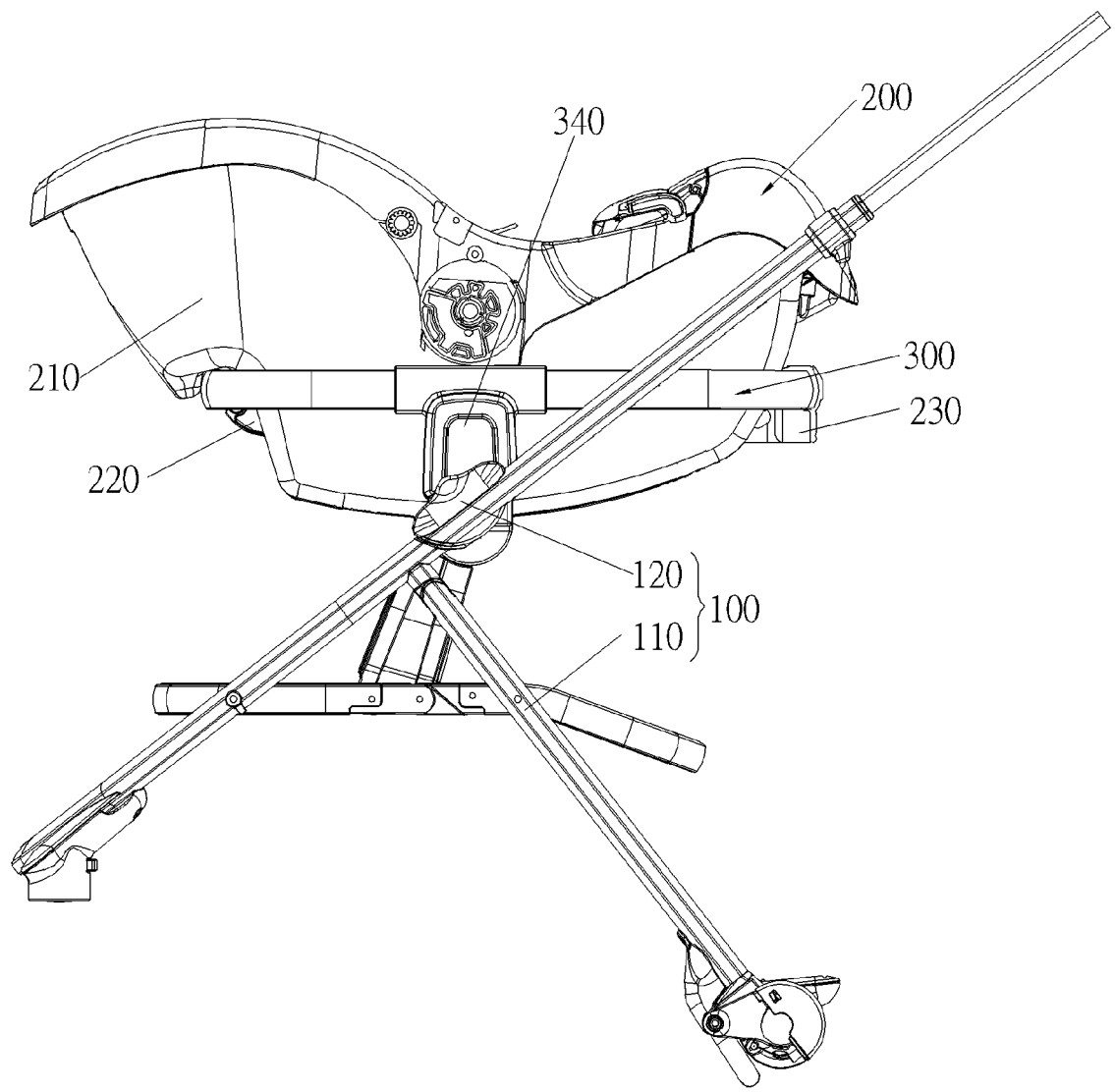
FIG. 1 is a diagram of a supporting mechanism installed on an infant carriage device and for supporting an infant carrier according to the present invention.

Please refer to FIG. 1. FIG. 1 is a diagram of a supporting mechanism 300 installed on an infant carriage device 100 and for supporting an infant carrier 200 according to the present invention. The infant carriage apparatus includes an infant carriage device 100, an infant carrier 200, and a supporting mechanism 300. The supporting mechanism 300 is detachably disposed on the infant carriage device 100 and for detachably supporting the infant carrier 200.

Figure 2:
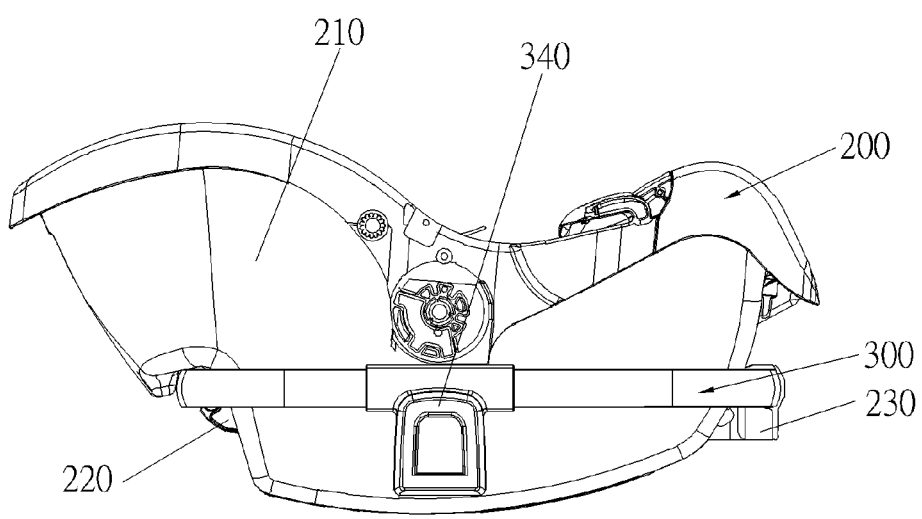
FIG. 2 is a diagram of the supporting mechanism and the infant carrier according to the present invention.

Please refer to FIG. 2. FIG. 2 is a diagram of the supporting mechanism 300 and the infant carrier 200 according to the present invention. As shown in FIG. 2, the supporting mechanism 300 is detachably supporting the infant carrier 200.

Figure 3:
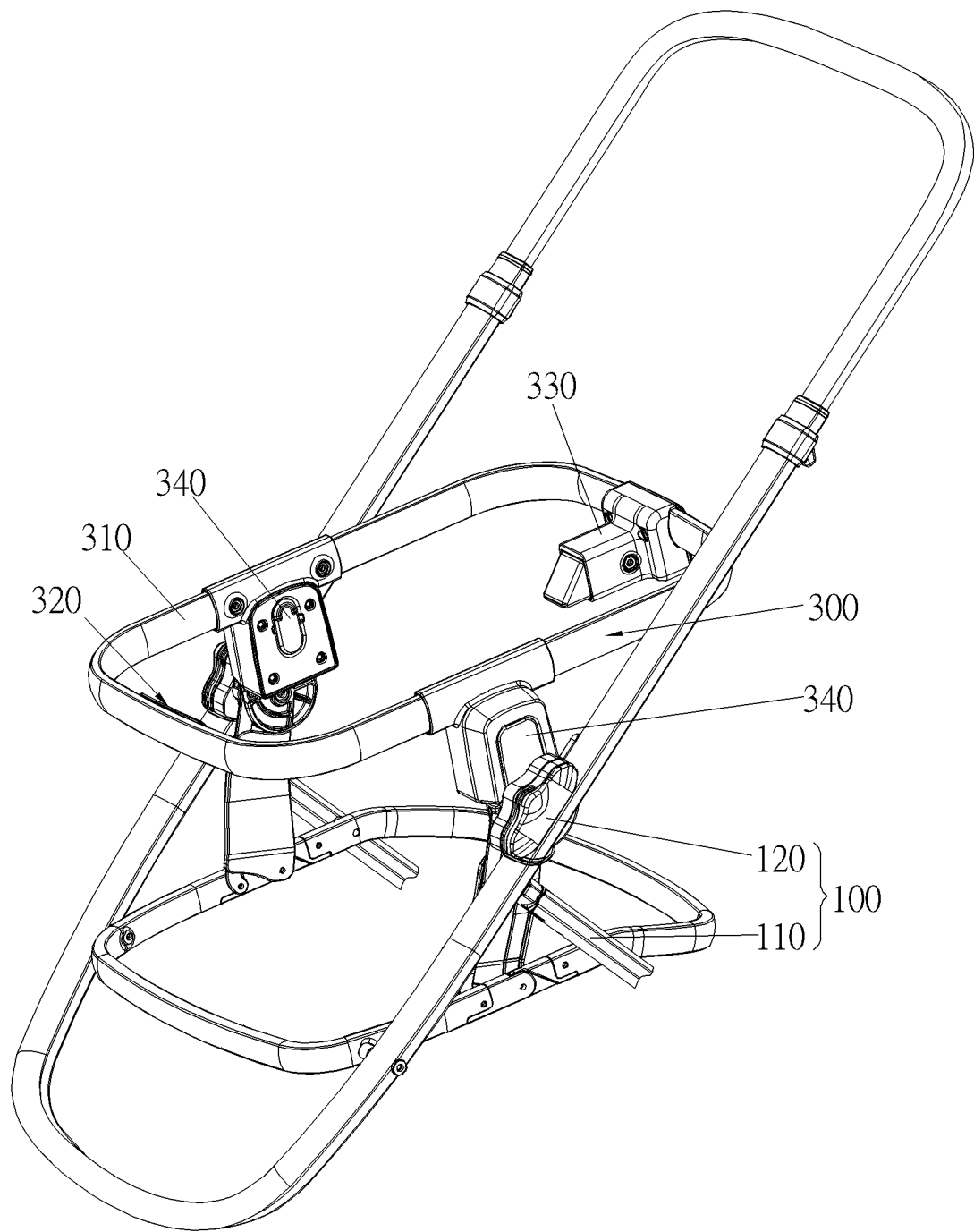
FIG. 3 is a schematic diagram of the supporting mechanism and the infant carriage device according to the present invention.

Please refer to FIG. 3. FIG. 3 is a schematic diagram of the supporting mechanism 300 and the infant carriage device 100 according to the present invention. As shown in FIG. 3, the supporting mechanism 300 is detachably disposed on the infant carriage device 100.

Figure 4:
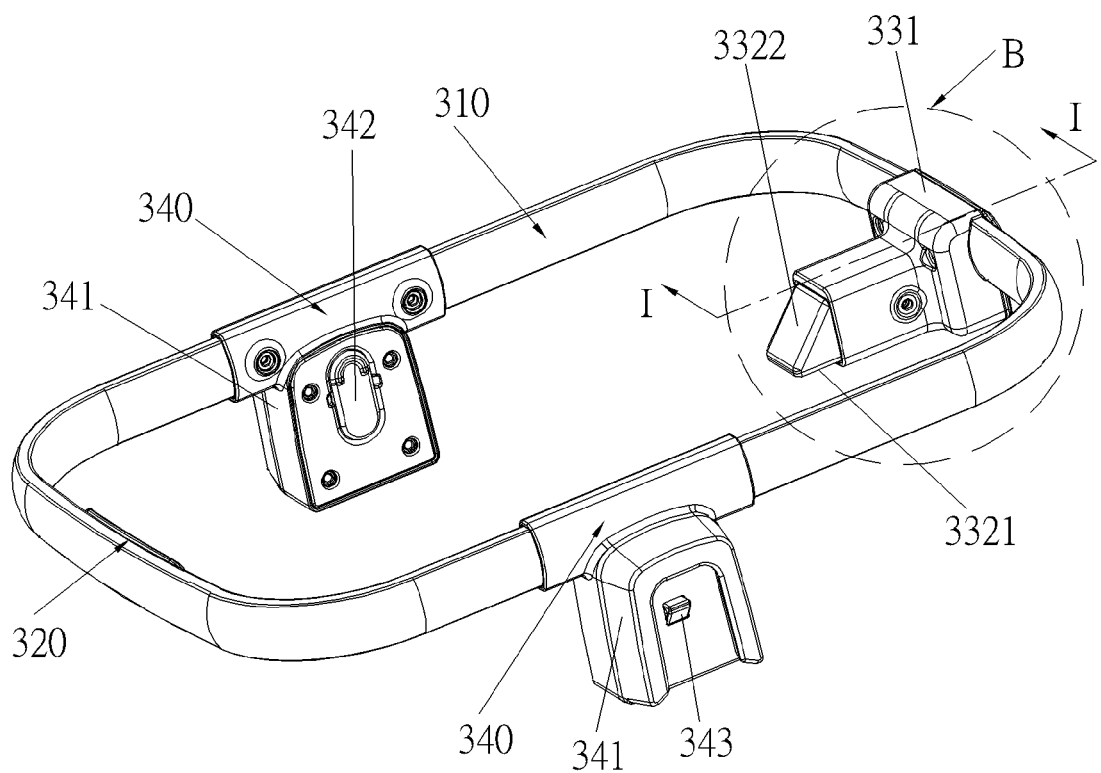
FIG. 4 and FIG. 5 are diagrams of the supporting mechanism in different views according to the first embodiment of the present invention.
Figure 5:
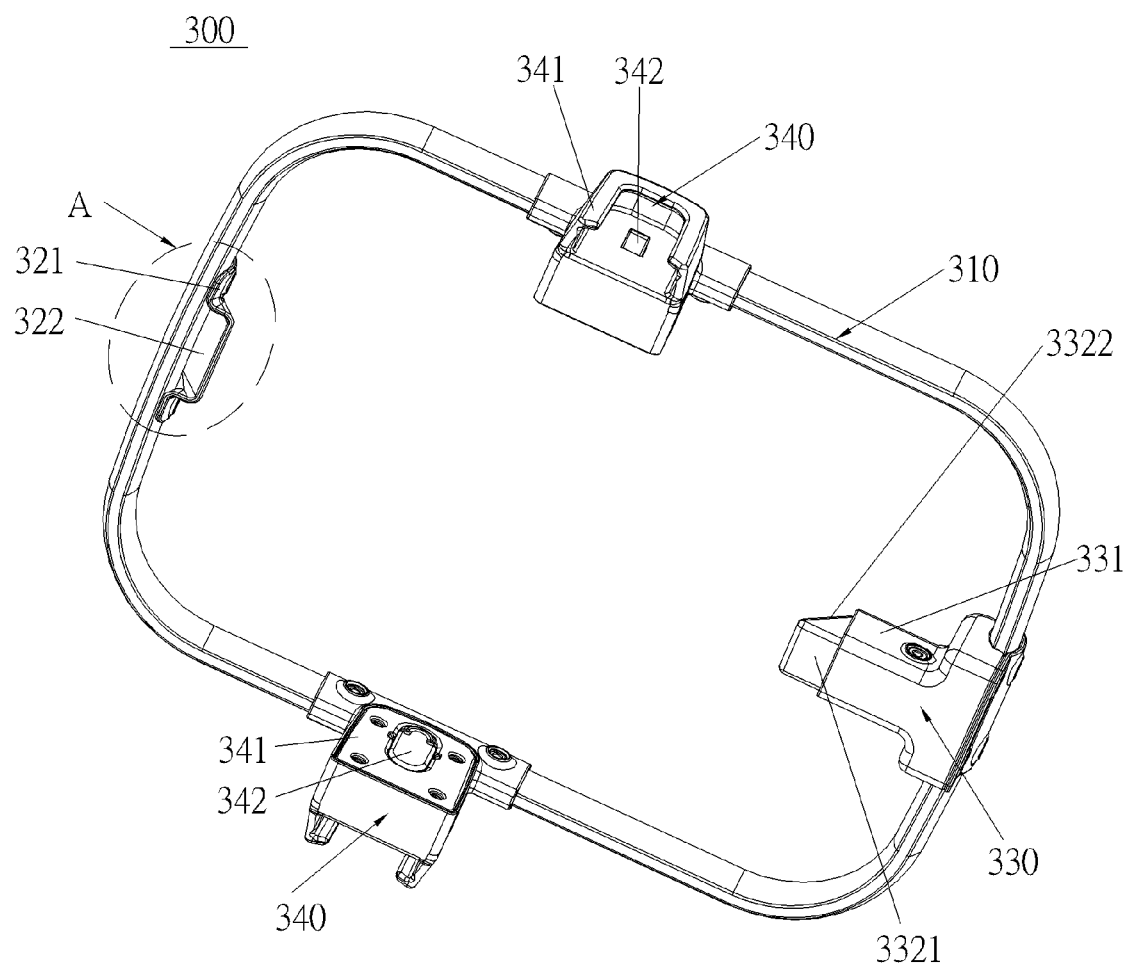

Please refer to FIG. 4 and FIG. 5. FIG. 4 and FIG. 5 are diagrams of the supporting mechanism 300 in different views according to the first embodiment of the present invention. The supporting mechanism 300 includes a main body 310, a first connecting component 320, a second connecting component 330 and at least one third connecting component 340. In this embodiment, there are two third connecting components 340, but not limited to this. The main body 310 is detachably disposed on the infant carriage device 100 by the third connecting components 340, the first connecting component 320 is fixed on the main body 310, a part of the second connecting component 330 is disposed in the main body 310 in a retractable manner, and the first connecting component 320 and the second connecting component 330 are for detachably supporting the infant carrier 200 cooperatively. In this embodiment, the main body 310 is formed as a rectangular frame, but not limited to this shape. The first connecting component 320 and the second connecting component 330 are disposed on the opposite sides of the main body 310, and the third connecting component 340 is disposed between the first connecting component 320 and the second connecting component 330. Specifically, the first connecting component 320 and the second connecting component 330 are separately disposed on two opposite sides of the main body 310, the two third connecting components 340 are separately disposed on the other two opposite sides of the main body 310, and the two third connecting components 340 are disposed between the first connecting component 320 and the second connecting component 330.

Figure 6:
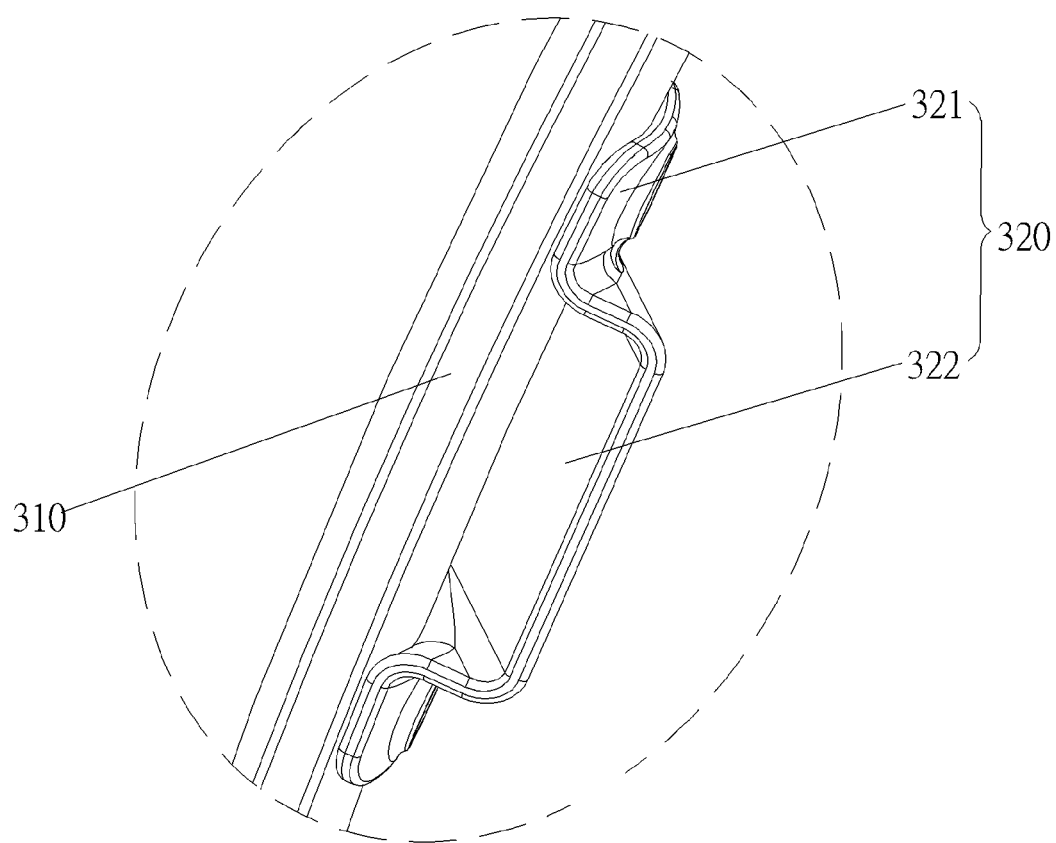
FIG. 6 is an enlarged diagram of area A shown in FIG. 5 according to the first embodiment of the present invention.
Figure 9:
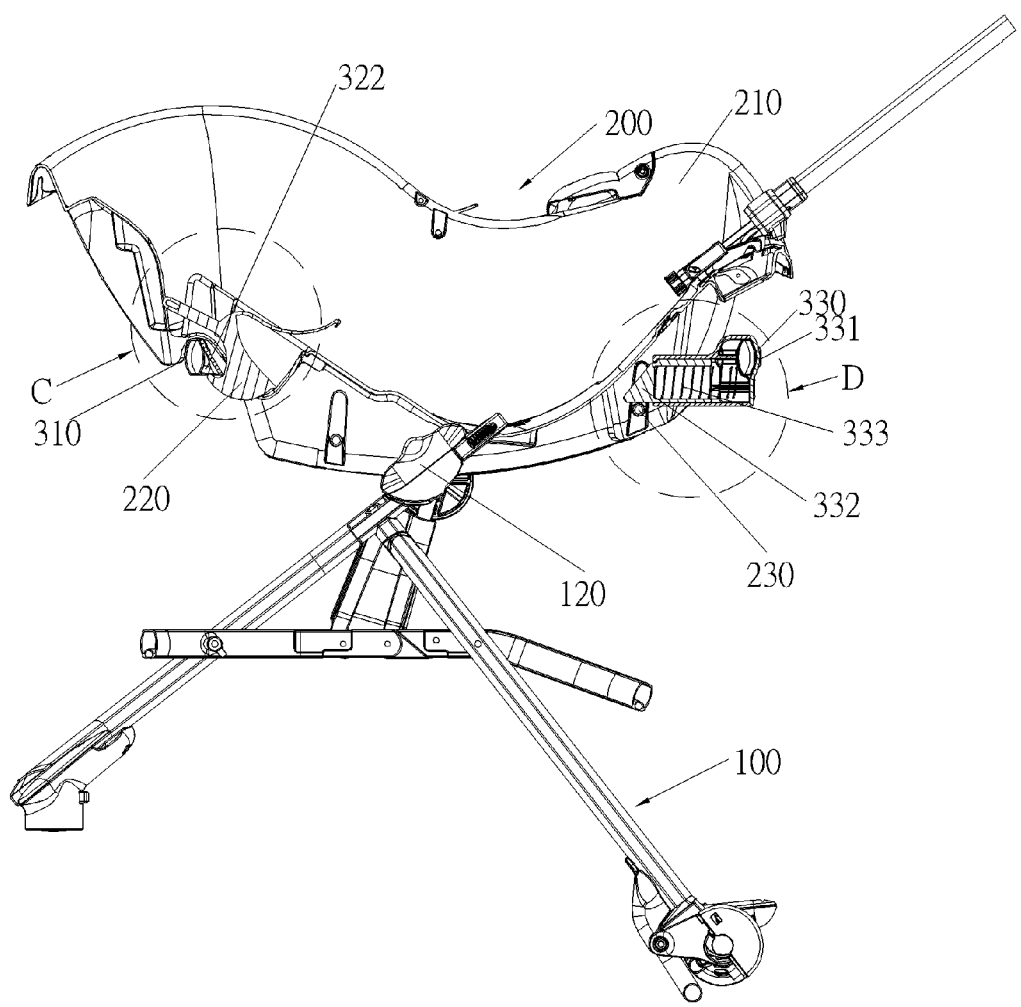
FIG. 9 is a partial cross-sectional diagram of FIG. 1 according to the first embodiment of the present invention.
Figure 10:
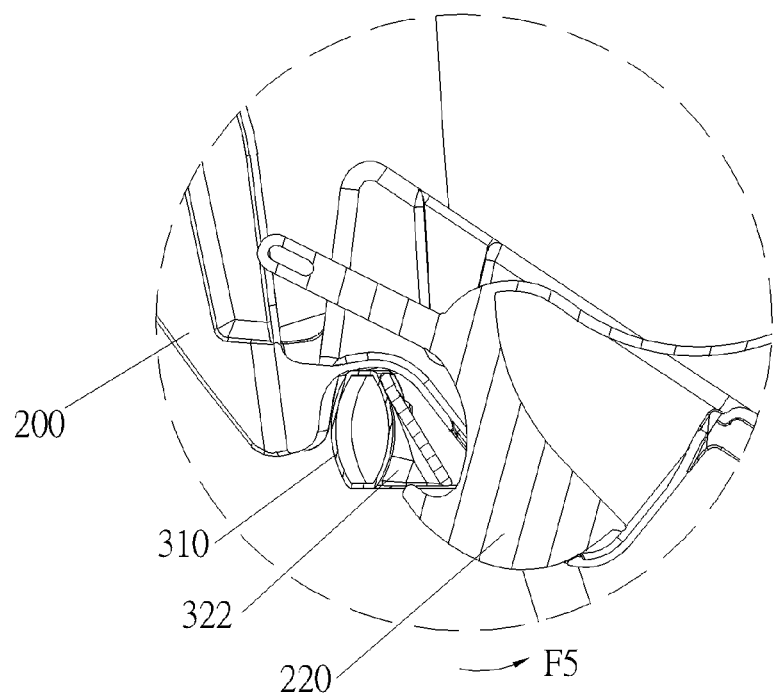
FIG. 10 is an enlarged diagram of area C shown in FIG. 9 according to the first embodiment of the present invention.

Specifically, please refer to FIG. 6, FIG. 9 and FIG. 10. FIG. 6 is an enlarged diagram of area A shown in FIG. 5 according to the first embodiment of the present invention. FIG. 9 is a partial cross-sectional diagram of FIG. 1 according to the first embodiment of the present invention. FIG. 10 is an enlarged diagram of area C shown in FIG. 9 according to the first embodiment of the present invention. The first connecting component 320 includes a first engaging portion 321 and a sunken portion 322. The first engaging portion 321 is fixed on the main body 310, and the sunken portion 322 is connected to the first engaging portion 321 for engaging with a part of the infant carrier 200. Preferably, the first engaging portion 321 and the sunken portion 322 are formed integrally. For example, the first engaging portion 321 and the sunken portion 322 can be formed by bending a plate structure, but it is not limited to this structure. The first engaging portion 321 and the sunken portion 322 also can be two separated parts, depending on the practical requirements. Accordingly, the infant carrier 200 includes a carrier body 210 and a first positioning component 220. The first positioning component 220 is disposed on the carrier body 210 in a retractable manner, and thus for engaging with the sunken portion 322. In this embodiment, the first positioning component 220 is a hook.

Figure 7:
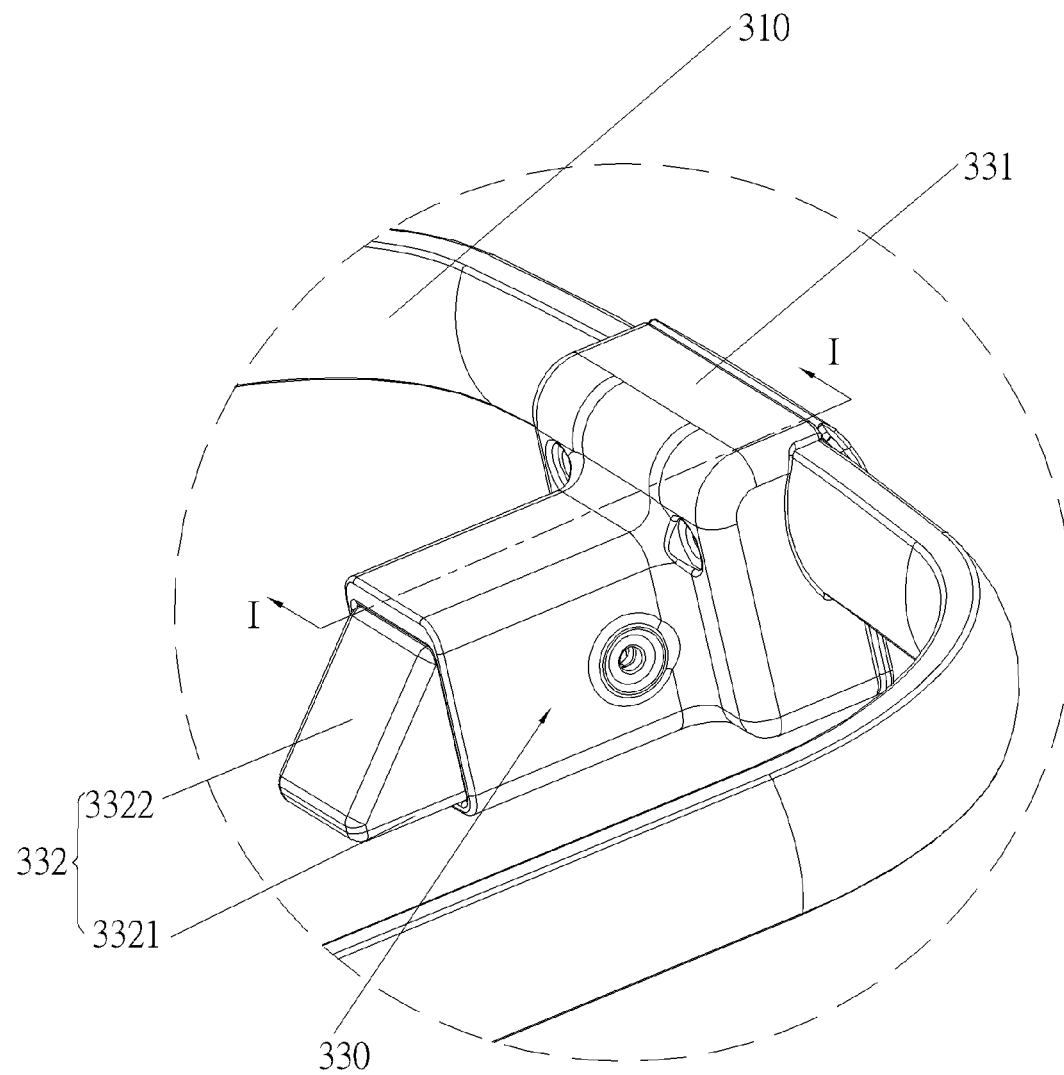
FIG. 7 is an enlarged diagram of area B shown in FIG. 4 according to the first embodiment of the present invention.
Figure 8:
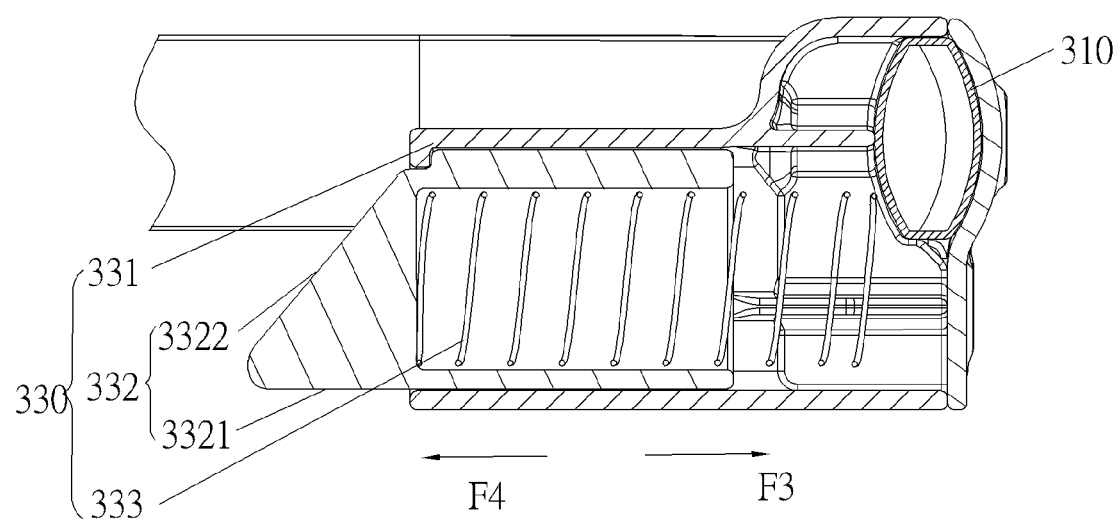
FIG. 8 is a cross-sectional diagram along line I-I in FIG. 7 according to the first embodiment of the present invention.
Figure 11:
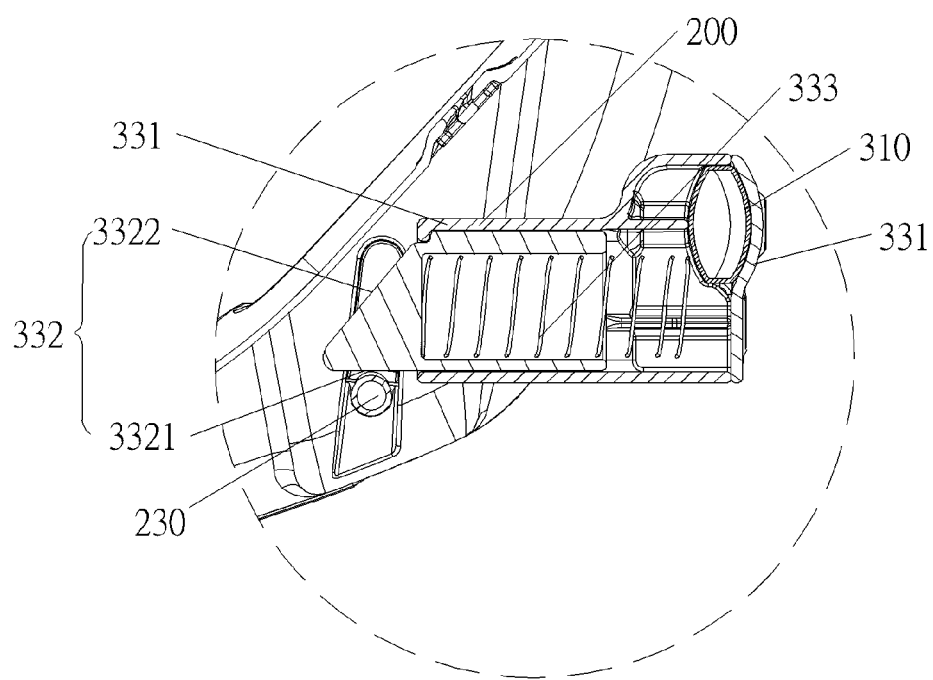
FIG. 11 is an enlarged diagram of area D shown in FIG. 9 according to the first embodiment of the present invention.

Specifically, please refer to FIG. 7, FIG. 8, FIG. 9 and FIG. 11. FIG. 7 is an enlarged diagram of area B shown in FIG. 4 according to the first embodiment of the present invention. FIG. 8 is a cross-sectional diagram along line I-I in FIG. 7 according to the first embodiment of the present invention. FIG. 11 is an enlarged diagram of area D shown in FIG. 9 according to the first embodiment of the present invention. The second connecting component 330 includes a second engaging portion 331, a pushing portion 332 and a resilient portion 333. The second engaging portion 331 is fixed on the main body 310, and the pushing portion 332 is connected to the second engaging portion 331 in a retractable manner for contacting against a part of the infant carrier 200. The pushing portion 332 and the sunken portion 322 face each other, as shown in FIG. 5, and the resilient portion 333 resiliently contacts between the pushing portion 332 and the second engaging portion 331. According to another embodiment of the present invention, the resilient portion 333 can resiliently contact between the pushing portion 332 and the main body 310. The pushing portion 332 continuously pushes the part of the infant carrier 200 by the resilient portion 333. Specifically, the resilient portion 333 can be a spring, a rubber component, or a combination thereof, but not limited to this. The resilient portion 333 can be made of any elastic material. Specifically, the pushing portion 332 includes a first surface 3321 for contacting against the part of the infant carrier 200, and a second surface 3322 inclined relative to the first surface 3321. Specifically, a distance between the first surface 3321 and the second surface 3322 is decreasing in a direction of that the pushing portion 332 stretches out of the second engaging portion 331. In this embodiment, the second surface 3322 can be an inclined surface, a curved surface, or a combination thereof, but not limited to this.

Accordingly, the carrier body 210 further includes a second positioning component 230. The second positioning component 230 is fixed on the carrier body 210, and thus for contacting against the pushing portion 332. The first surface 3321 of the pushing portion 332 continuously contacts against the second positioning component 230 because of a resilient force of the resilient portion 333. In this embodiment, the second positioning component 230 is a stick, and the second surface 3322 is an inclined or a curved surface, so as to act as a guiding function. The main body 310 supporting the infant carrier 200 may be realized by the engagement of the sunken portion 322 of the first connecting component 320 and the first positioning component 220 of the infant carrier 200, the contact positioning of the pushing portion 332 of the second connecting component 330 and the second positioning component 230, and the support provided by the main body 310 to the carrier body 210 of the infant carrier 200.

Figure 12:
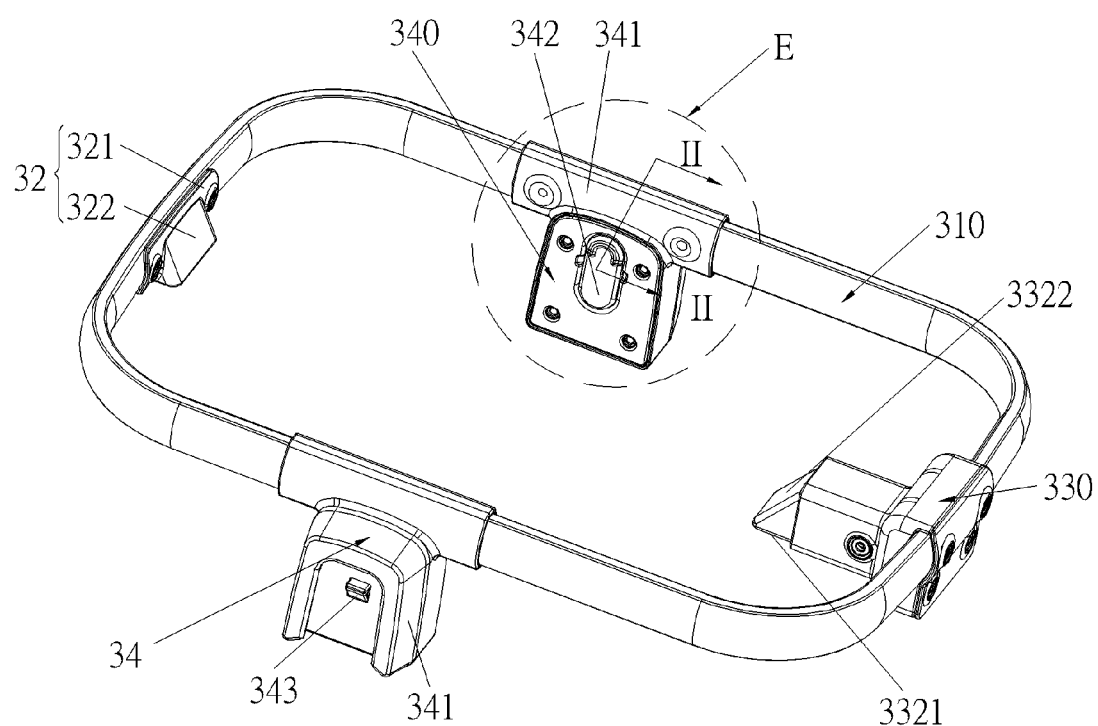
FIG. 12 is a diagram of the supporting mechanism in another view according to the first embodiment of the present invention.
Figure 13:
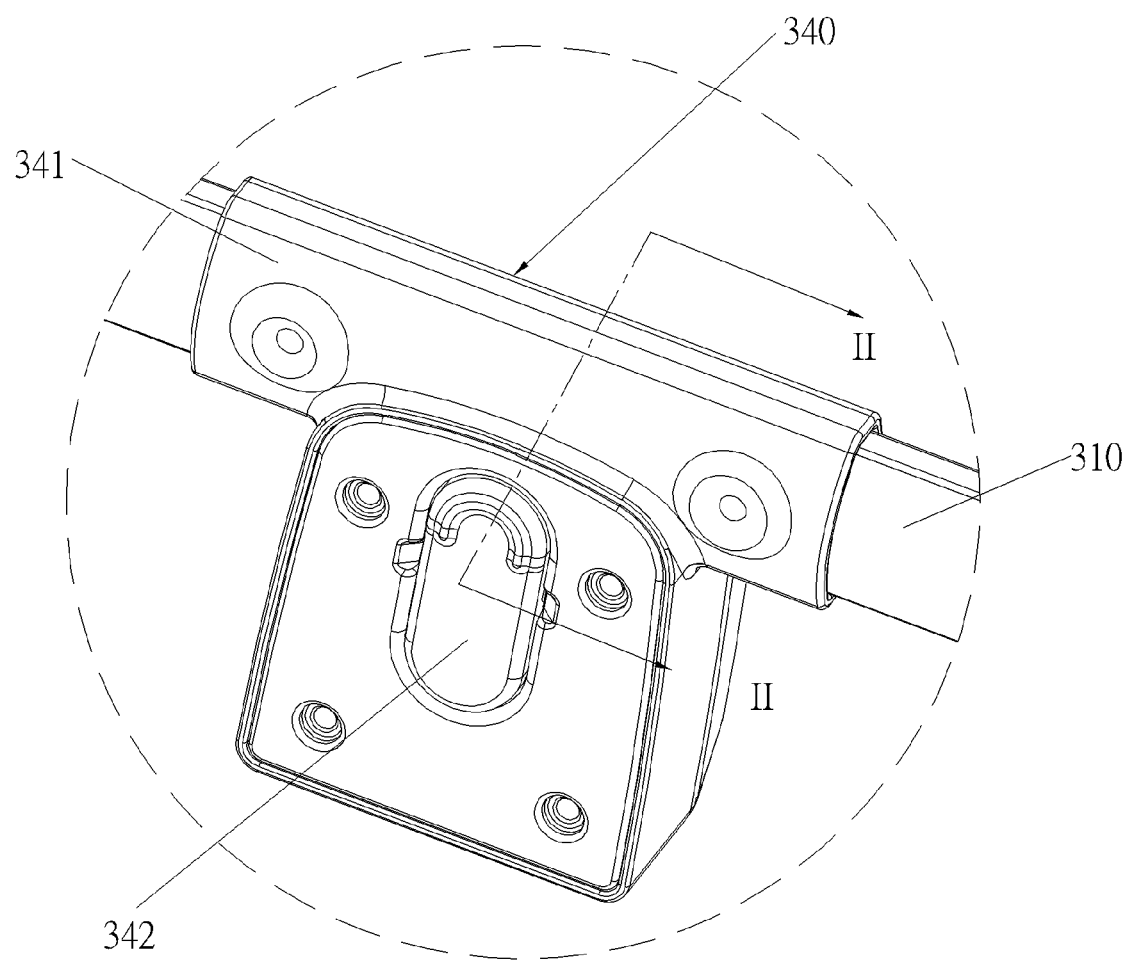
FIG. 13 is an enlarged diagram of area E shown in FIG. 12 according to the first embodiment of the present invention.
Figure 14:
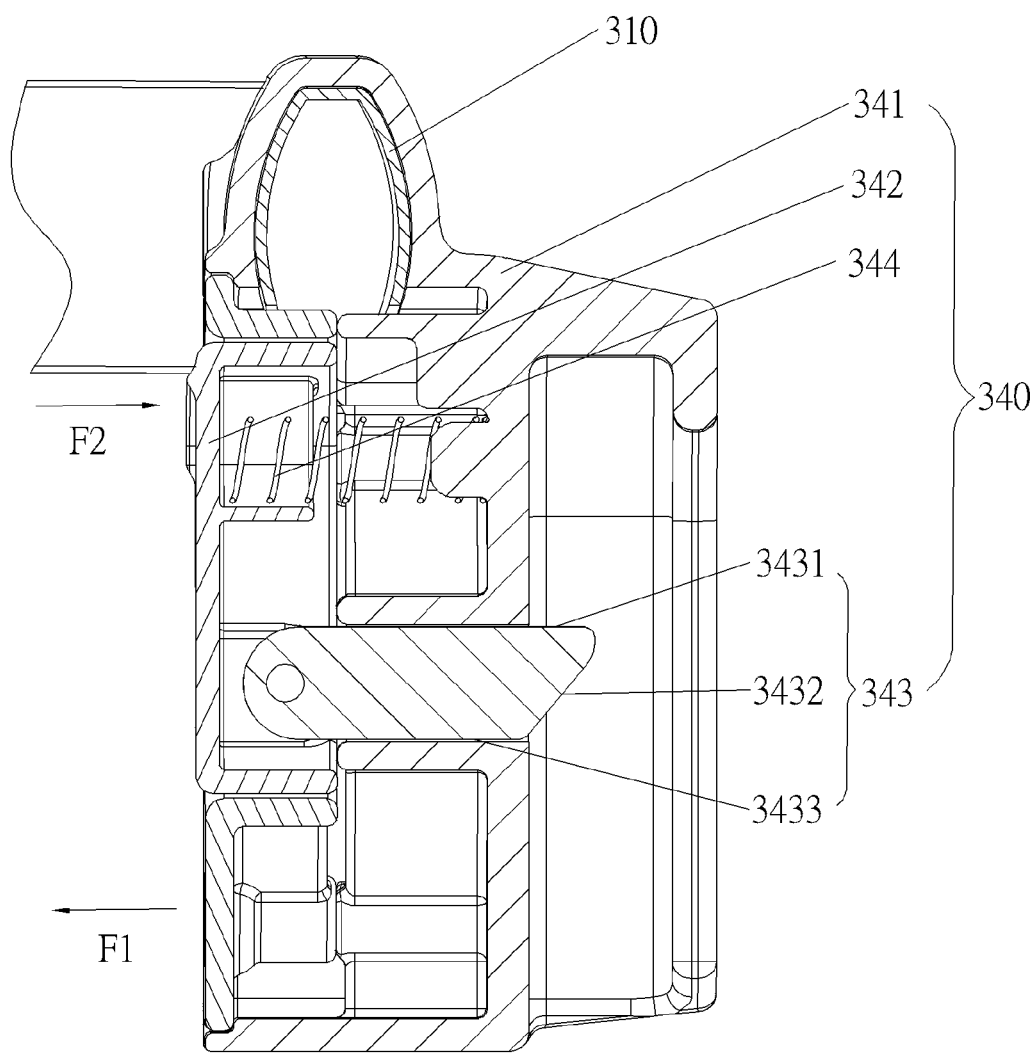
FIG. 14 is a cross-sectional diagram along line II-II in FIG. 13 according to the first embodiment of the present invention.
Figure 15:
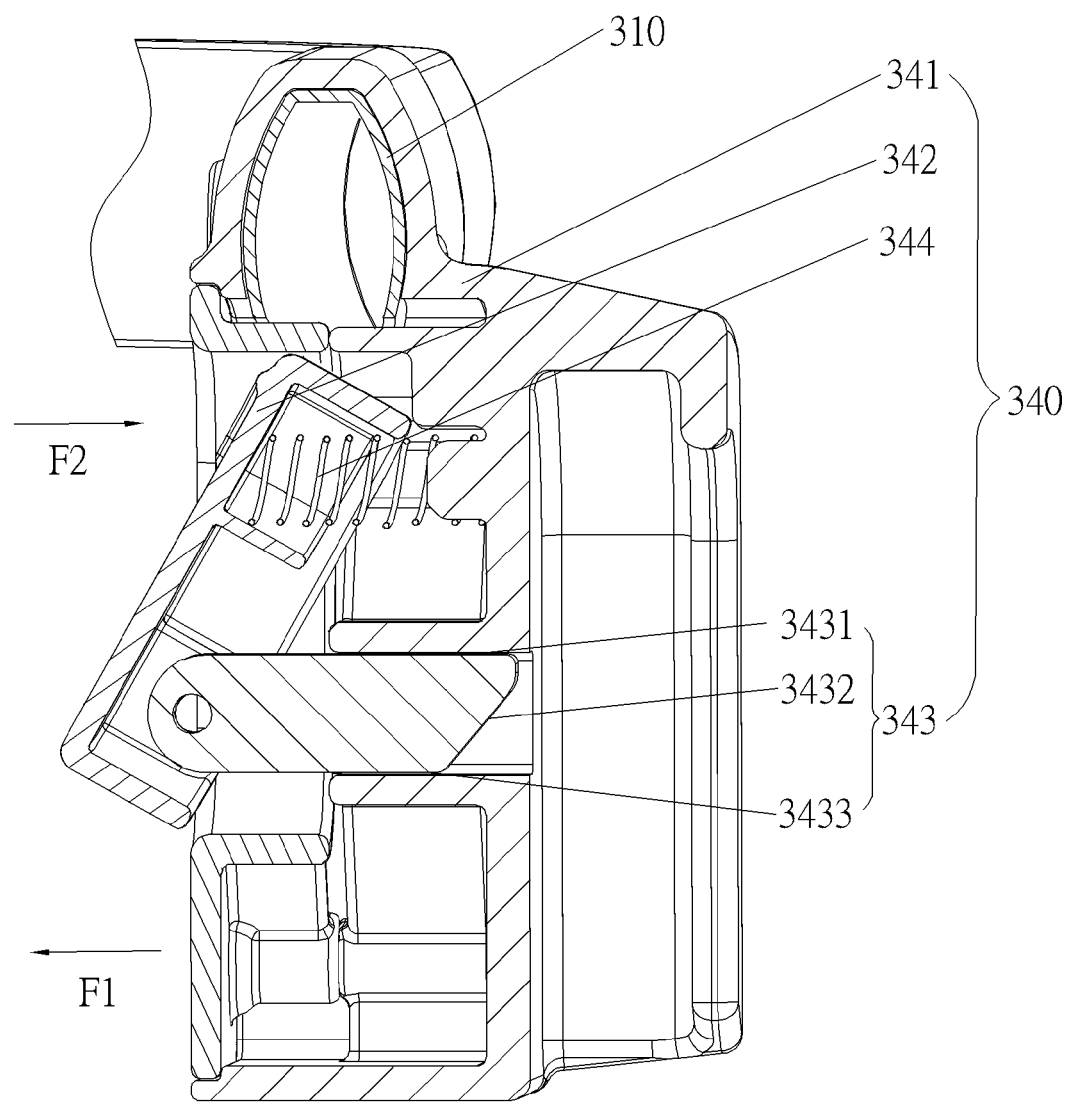
FIG. 15 is a cross-sectional diagram along line II-II in FIG. 13 in an operating status according to the first embodiment of the present invention.

Please refer to FIG. 12 to FIG. 15. FIG. 12 is a diagram of the supporting mechanism in another view according to the first embodiment of the present invention. FIG. 13 is an enlarged diagram of area E shown in FIG. 12 according to the first embodiment of the present invention. FIG. 14 is a cross-sectional diagram along line II-II in FIG. 13 according to the first embodiment of the present invention. FIG. 15 is a cross-sectional diagram along line II-II in FIG. 13 in an operating status according to the first embodiment of the present invention. The third connecting component 340 includes a third engaging portion 341, an operating portion 342, a tenon portion 343 and a restoring portion 344. The third engaging portion 341 is fixed on the main body 310, the tenon portion 343 is connected to the third engaging portion 341 in a retractable manner, and the operating portion 342 is connected to the tenon portion 343 and for driving the tenon portion 343 to selectively engage with or detach from the infant carriage device 100. Specifically, the operating portion 342 is pivotally connected to the third engaging portion 341, and the tenon portion 343 is pivotally connected to the operating portion 342. A pivotal joint of the operating portion 342 and the third engaging portion 341 is different from a pivotal joint of the tenon portion 343 and the operating portion 342. That is, the pivotal joint of the operating portion 342 and the third engaging portion 341 located at different places from the pivotal joint of the tenon portion 343 and the operating portion 342. The restoring portion 344 resiliently contacts between the operating portion 342 and the third engaging portion 341 for continuously driving the tenon portion 343 to engage with the infant carriage device 100. According to this embodiment, the restoring portion 344 can be a spring, a rubber component or a combination thereof, but not limited to this. The restoring portion 344 can be made of any elastic material.

Specifically, as shown in FIG. 14, the tenon portion 343 includes a first side 3431 and a third side 3433 contacting against the infant carriage device 100, and a second side 3432. The second side 3432 is formed between the first side 3431 and the third side 3433, and the second side 3432 is inclined relative to the first side 3431 and the third side 3433. A distance between the first side 3431 and the second side 3432 is decreasing in a direction away from a junction of the main body 310 and the third engaging portion 341, and a distance between the third side 3433 and the second side 3432 is increasing in a direction away from the junction of the main body 310 and the third engaging portion 341. In this embodiment, the second side 3432 can be an inclined surface, a curved surface or a combination thereof. Accordingly, the infant carriage device 100 includes a carriage body 110 and an engaging structure 120 fixed on the carriage body 110, as shown in FIG. 1, FIG. 3 and FIG. 9. The first side 3431 and the third side 3433 of the tenon portion 343 contact against the engaging structure 120 by a resilient force of the restoring portion 344 for assembling the supporting mechanism 300 with infant carriage device 100. For disassembling the supporting mechanism 300 from the infant carriage device 100, the operating portion 342 drives the first side 3431 and the third side 3433 of the tenon portion 343 to detach from the engaging structure 120. According to another embodiment, assembling the supporting mechanism 300 with the infant carriage device 100 may also be realized by the third engaging portion 341 and the first side 3431 contacting against the engaging structure 120, or the third engaging portion 341 and the third side 3433 contacting the engaging structure 120, but not limited to this.

The operation of the supporting mechanism 300 according to the first embodiment of the present invention applying to the infant carriage device 100 is described in detail as follows. Please refer to FIG. 14 and FIG. 15. For assembling the supporting mechanism 300 with the infant carriage device 100, the supporting mechanism 300 is put down onto the infant carriage device 100, so that the engaging structure 120 pushes the second side 3432 of the tenon portion 343 to move in a direction F1, and the operating portion 342 moves in a direction F2 to push the restoring component 344 to a status shown in FIG. 15. And then, the resilient force of the restoring portion 344 drives the tenon portion 343 to move in the direction F2 for re-engaging with the engaging structure 120, so as to assemble the supporting mechanism 300 with the infant carriage device 100.

Please refer to FIG. 6, FIG. 8, FIG. 10 and FIG. 11. For assembling the infant carrier 200 on the supporting mechanism 300, the infant carrier 200 is put down onto the supporting mechanism 300, and the first positioning component 220 of the infant carrier 200 engages with the sunken portion 322 of the first connecting component 320 from bottom to top. The second surface 3322 of the pushing portion 332 is pushed by the second positioning component 230 and moves in a direction F3 (as shown in FIG. 8) close to a junction of the main body 310 and the second engaging portion 331 to press the resilient portion 333, and then the resilient force of the resilient portion 333 drives the pushing portion 332 to move in a direction F4 shown in FIG. 8 until the first surface 3321 contacts the second positioning component 230. The main body 310 supports the carrier body 210 of the infant carrier 200, so as to complete the assembly of the supporting mechanism 300 with the infant carrier 200.

For detaching the infant carrier 200 from the supporting mechanism 300, the first positioning component 220 pivots in a pivotal direction F5 shown in FIG. 10 until the first positioning component 220 detaches from the sunken portion 322 of the first connecting component 320, and then lifts the carrier body 210, so that the second positioning component 230 detaches from the pushing portion 332. The disassembly of the supporting mechanism 300 and the infant carrier 200 is hence completed.

For detaching the supporting mechanism 300 from the infant carriage device 100, the operating portion 342 is pressed in a direction F2 shown in FIG. 13 to drive the tenon portion 343 to move in a direction F1, so that the tenon portion 343 detaches from the engaging structure 120, so as to complete the disassembly of the supporting mechanism 300 and the infant carriage device 100.

Figure 16:
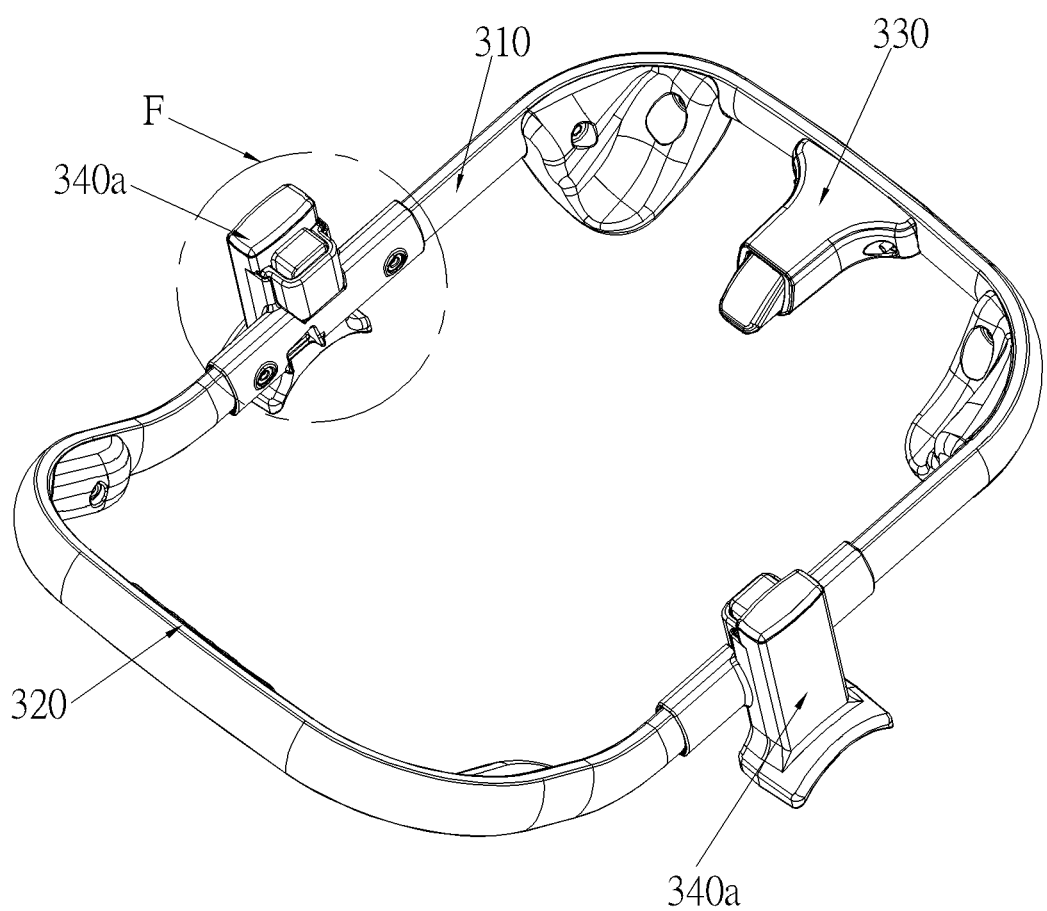
FIG. 16 is a schematic diagram of the supporting mechanism according to a second embodiment of the present invention.
Figure 17:
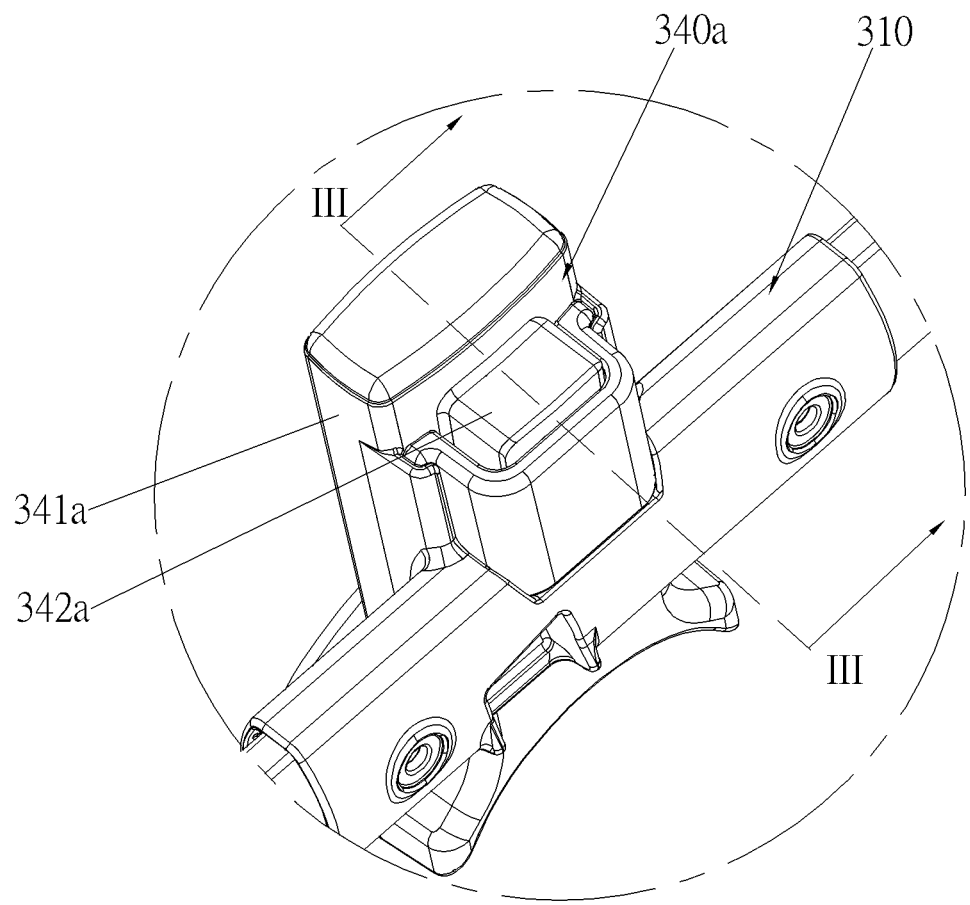
FIG. 17 is an enlarged diagram of area F shown in FIG. 16 according to the second embodiment of the present invention.
Figure 18:
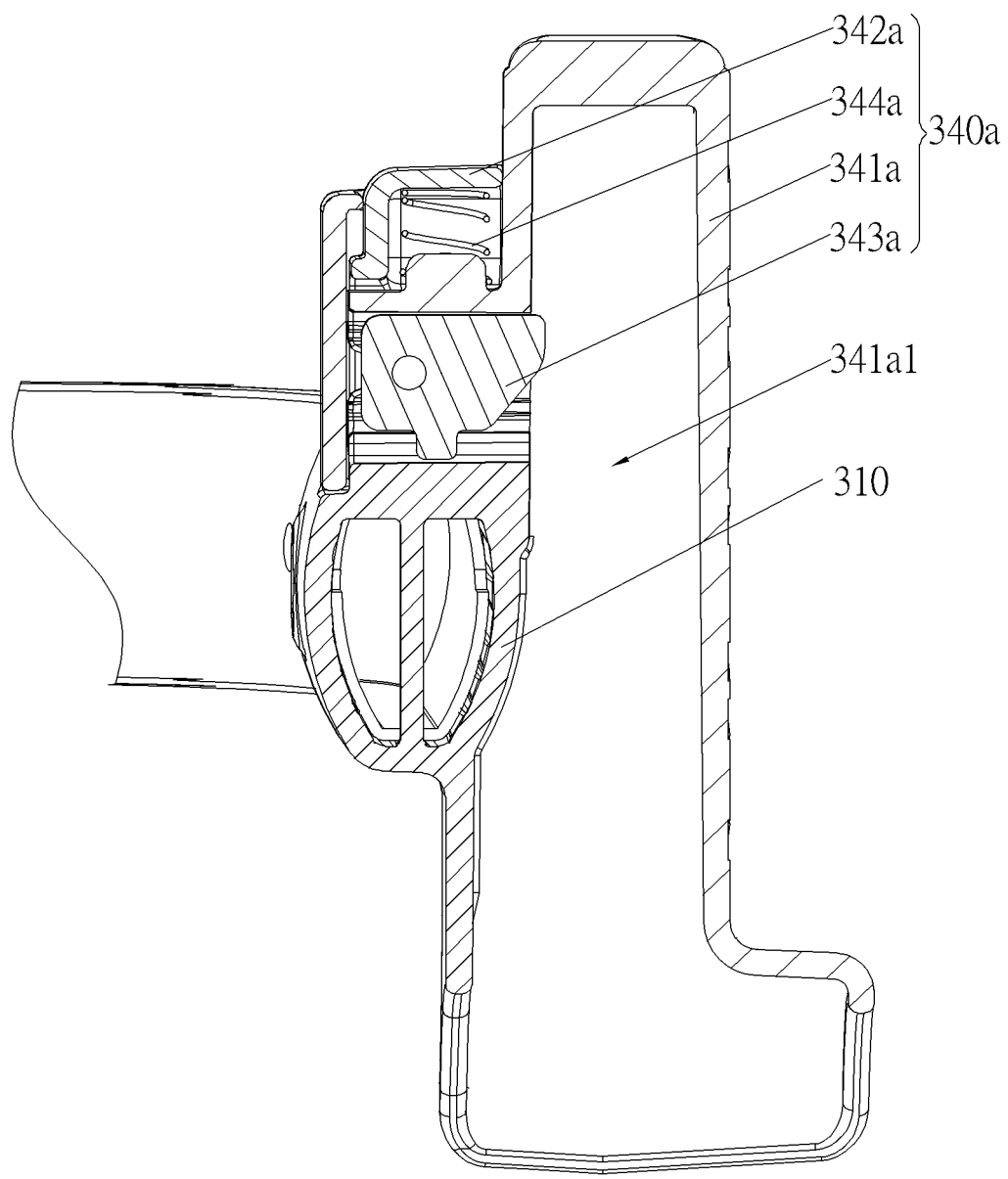
FIG. 18 is a cross-sectional diagram along line III-III in FIG. 17 according to the second embodiment of the present invention.
Figure 19:
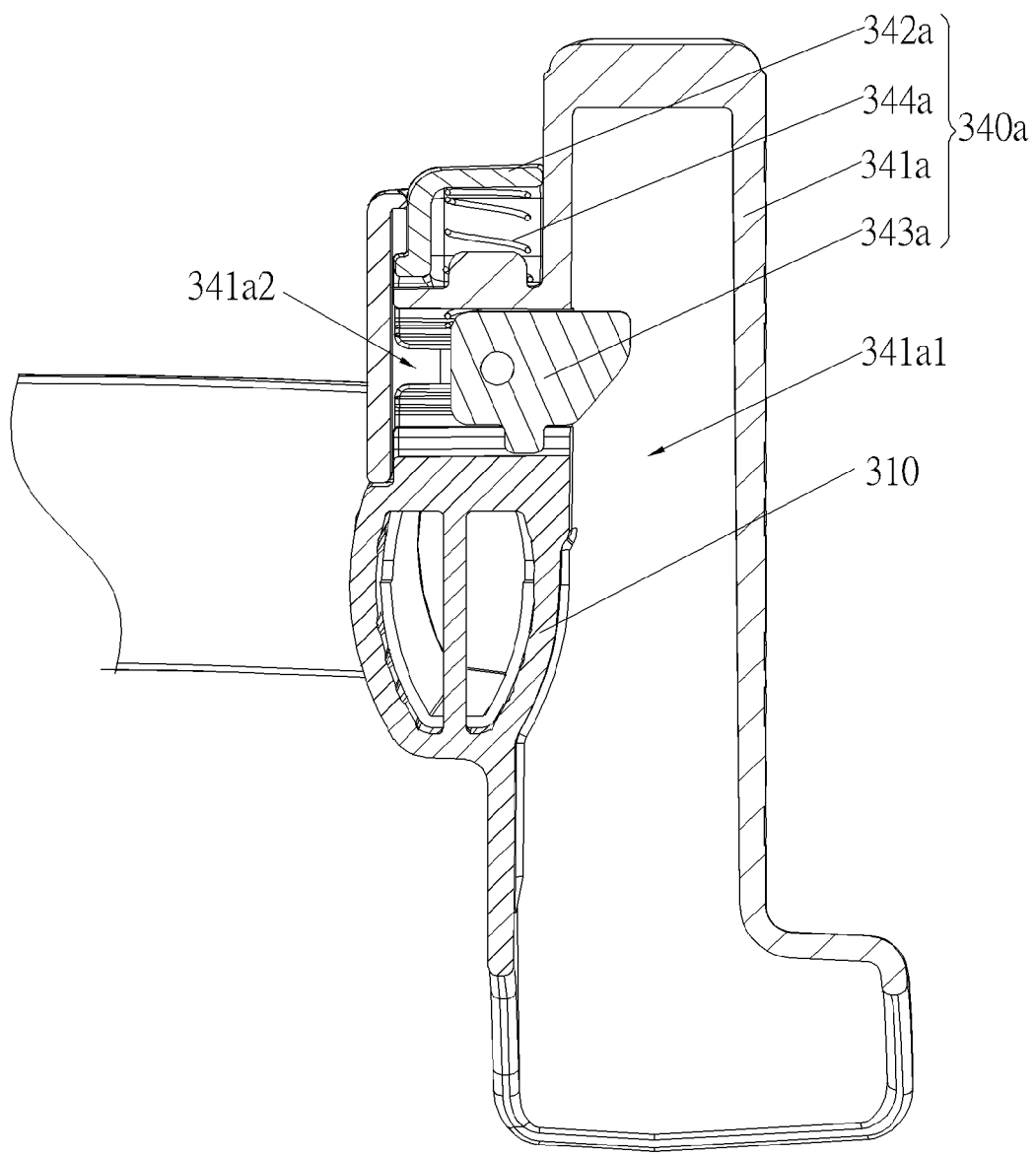
FIG. 19 is a cross-sectional diagram along line III-III in FIG. 17 in an operating status according to the second embodiment of the present invention.
Figure 20:
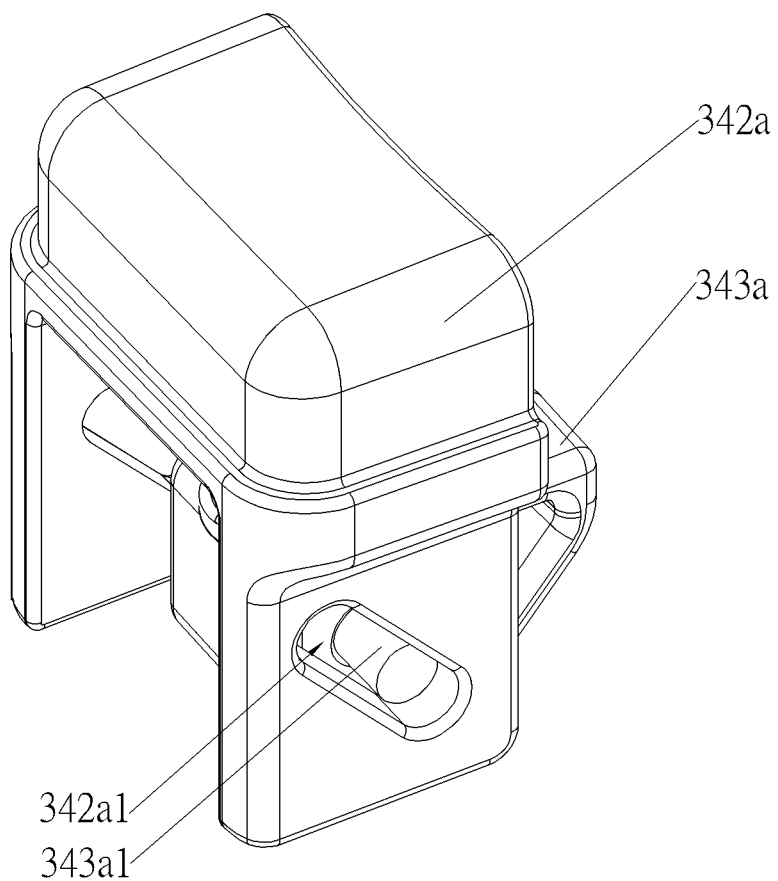
FIG. 20 is a diagram of an operating portion and a tenon portion of the supporting mechanism according to the second embodiment of the present invention.

Please refer to the second embodiment shown in FIG. 16 to FIG. 20. FIG. 16 is a schematic diagram of the supporting mechanism 300 according to a second embodiment of the present invention. FIG. 17 is an enlarged diagram of area F shown in FIG. 16 according to the second embodiment of the present invention. FIG. 18 is a cross-sectional diagram along line III-III in FIG. 17 according to the second embodiment of the present invention. FIG. 19 is a cross-sectional diagram along line III-III in FIG. 17 in an operating status according to the second embodiment of the present invention. FIG. 20 is a diagram of an operating portion 342a and a tenon portion 343a of the supporting mechanism 300 according to the second embodiment of the present invention. The third connecting component 340a of the supporting mechanism 300 according to the second embodiment is different from the third connecting component 340 according to the first embodiment.

The third connecting component 340a includes a third engaging portion 341a, an operating portion 342a, a tenon portion 343a, and a restoring portion 344a. The third engaging portion 341a is fixed on the main body 310, a containing chamber 341a1 is disposed on a side of the third engaging portion 341a and is for the engaging structure 120 to stretch in. The tenon portion 343a is connected to the third engaging portion 341a in a retractable manner, and the operating portion 342a is slidably connected to the third engaging portion 341a and operably connected to the tenon portion 343a, and thus drive the operating portion 342a to slide relative to the third engaging portion 341a, so that the tenon portion 343a may selectively engage with or detach from the infant carriage device 100. Specifically, a sliding chamber 341a2 is disposed in the third engaging portion 341a and communicated to the containing chamber 341a1, the tenon portion 343a is slidably disposed in the sliding chamber 341a2, and an end of the tenon portion 343a stretches into the containing chamber 341a1 for engaging with the engaging structure 120. An end of the operating portion 342a stretches into the third engaging portion 341a, and the other end of the operating portion 342a is stretched out of the third engaging portion 341b for operation. Sliding slots 342a1 are disposed on the two sides of the stretched end of the operating portion 342a, an extending direction of the sliding slots 342a1 and a sliding direction of the operating portion 342a are intersected. Specifically, an angle formed by the extending direction of the sliding slots 342a1 and a sliding direction of the operating portion 342a can be an acute angle or an obtuse angle. Sliding sticks 343a1 are formed and protruded out of the two sides of an end of the tenon portion 343a and slidably inserted in the sliding slots 342a1. The operating portion 342a drives the tenon portion 343a to slide in the sliding chamber 341a2 to exit from the containing chamber 341a1 by the two sliding sticks 343a1 and the sliding slots 342a1, so that the tenon portion 343a may detach from the engaging structure 120. Furthermore, the restoring portion 344a resiliently contacts between the operating portion 342a and the tenon portion 343a. When the operation on the operating portion 342a is stopped, the restoring portion 344a resiliently contacts the operating portion 342a, and drives the tenon portion 343a to slide in the sliding chamber 341a2 for entering the containing chamber 341a1 by the two sliding sticks 343a1 and the sliding slots 342a1, so that the tenon portion 343a may engage with the engaging structure 120. The restoring portion 344a can resiliently contact between the operating portion 342a and the third engaging portion 341a or the main body 310, as long as the tenon portion 343a may continuously engage with the infant carriage device 100; thus, the restoring portion 344a can also resiliently contact the tenon portion 343a.

Specifically, as the operating portion 342a is driven by an external force to slide relative to the third engaging portion 341a, the operating portion 342a drives the tenon portion 343a to detach from the infant carriage device 100. As the external force is stopped, the restoring portion 344a can provide elastic force to drive the operating portion 342a to slide relative to the third engaging portion 341a and restore, so that the tenon portion 343a engages with the infant carriage device 100. According to this embodiment, the restoring portion 344a can be a spring, a rubber component, or a combination thereof, but not limited to this. The restoring portion 344a can be made of any elastic material.

Figure 21:
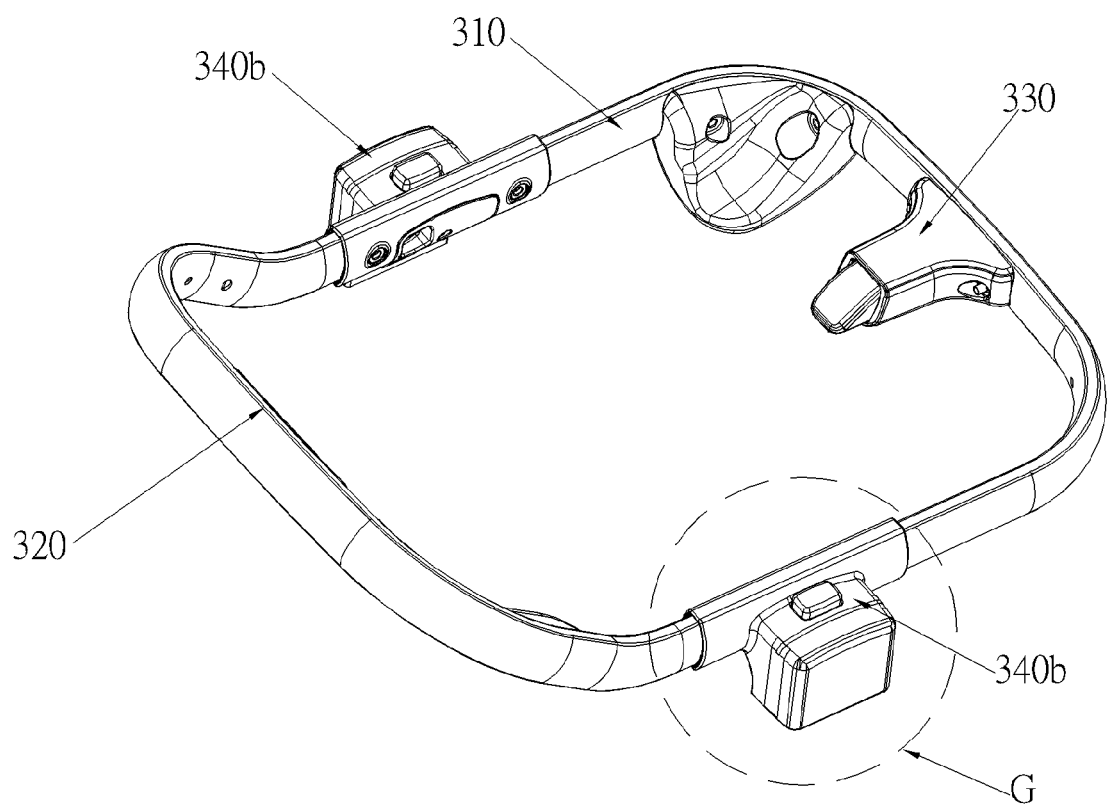
FIG. 21 is a schematic diagram of the supporting mechanism according to a third embodiment of the present invention.
Figure 22:
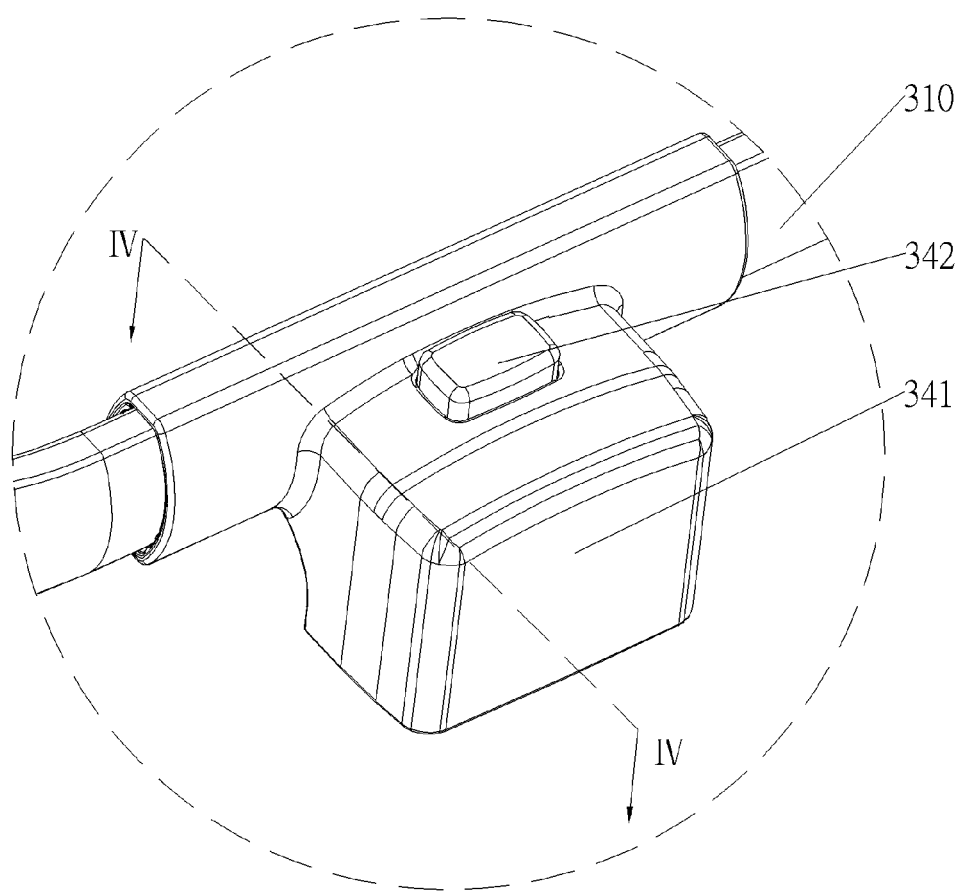
FIG. 22 is an enlarged diagram of area G shown in FIG. 21 according to the third embodiment of the present invention.
Figure 23:
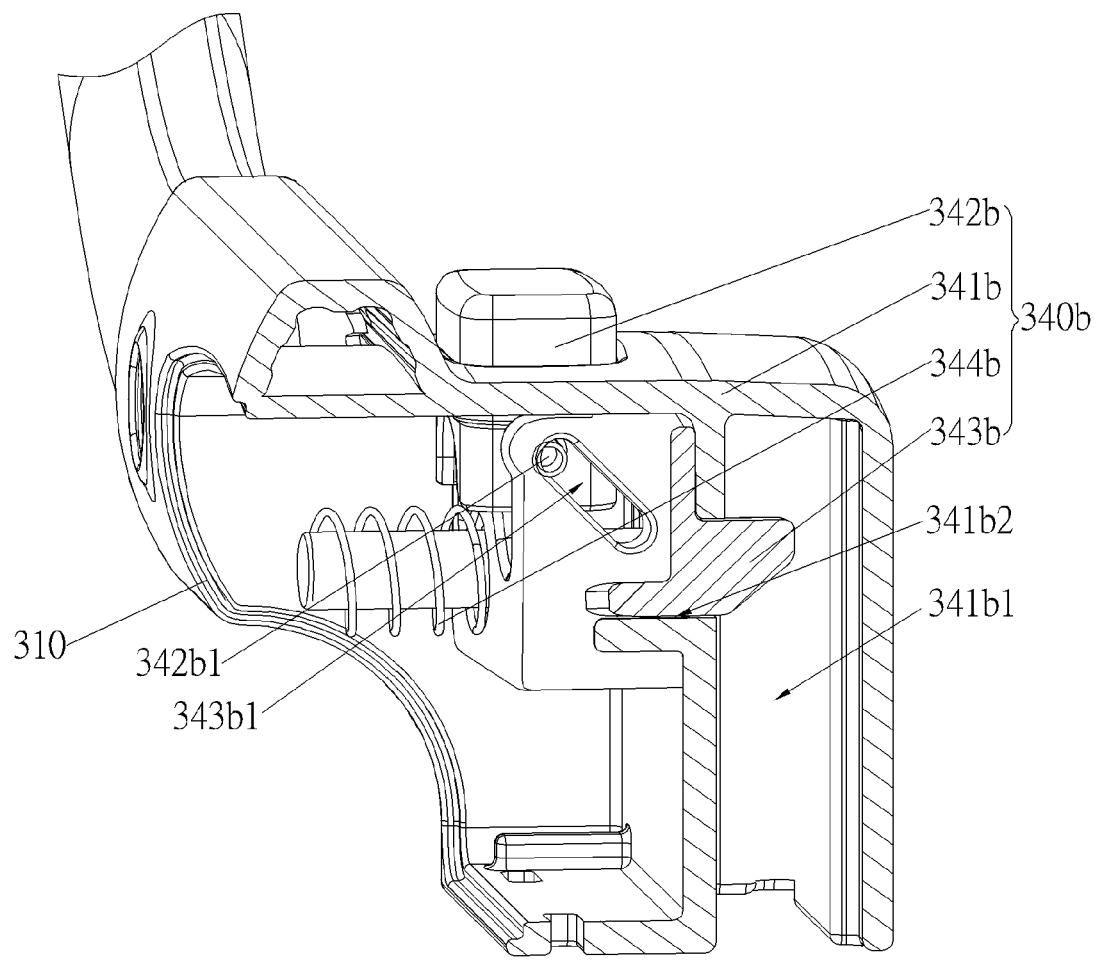
FIG. 23 is a cross-sectional diagram along line IV-IV in FIG. 22 according to the third embodiment of the present invention.
Figure 24:
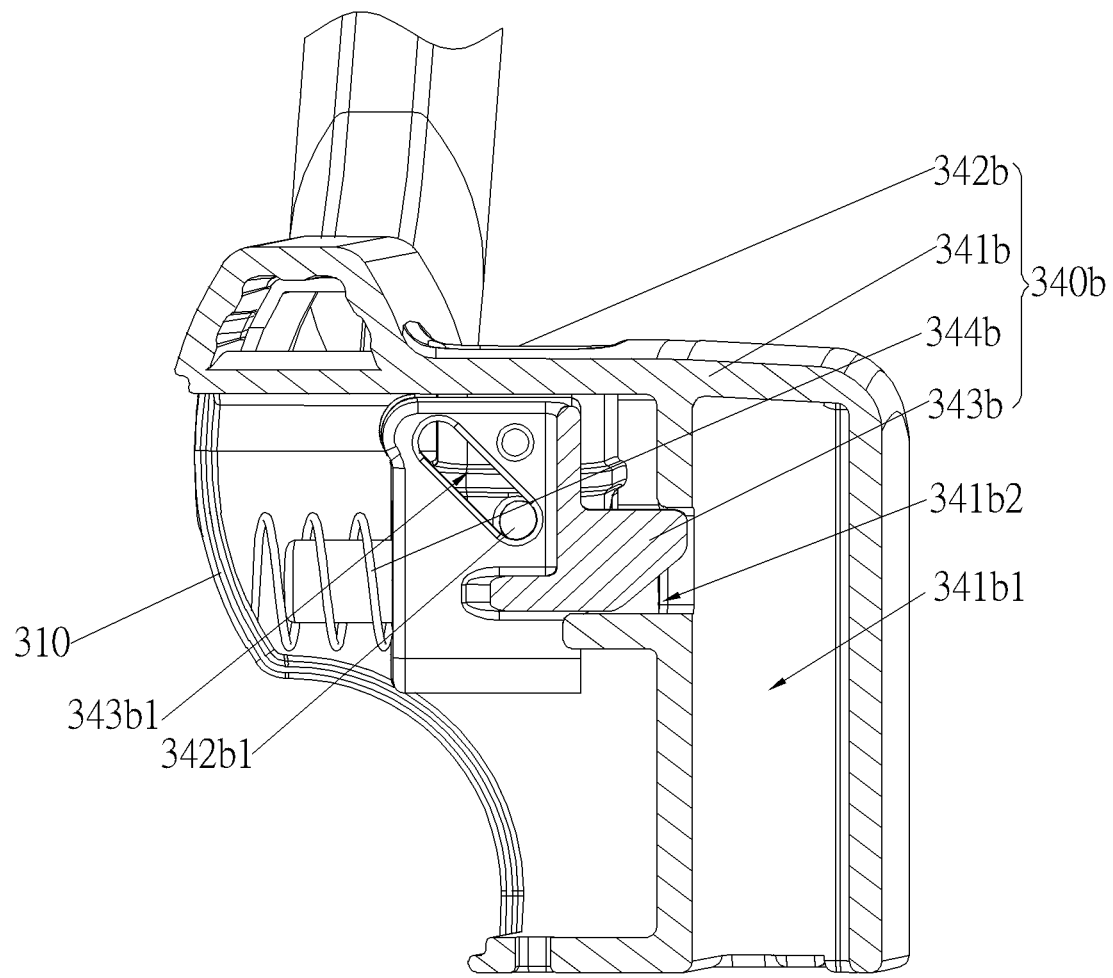
FIG. 24 is a cross-sectional diagram along line IV-IV in FIG. 22 in an operating status according to the third embodiment of the present invention.
Figure 25:
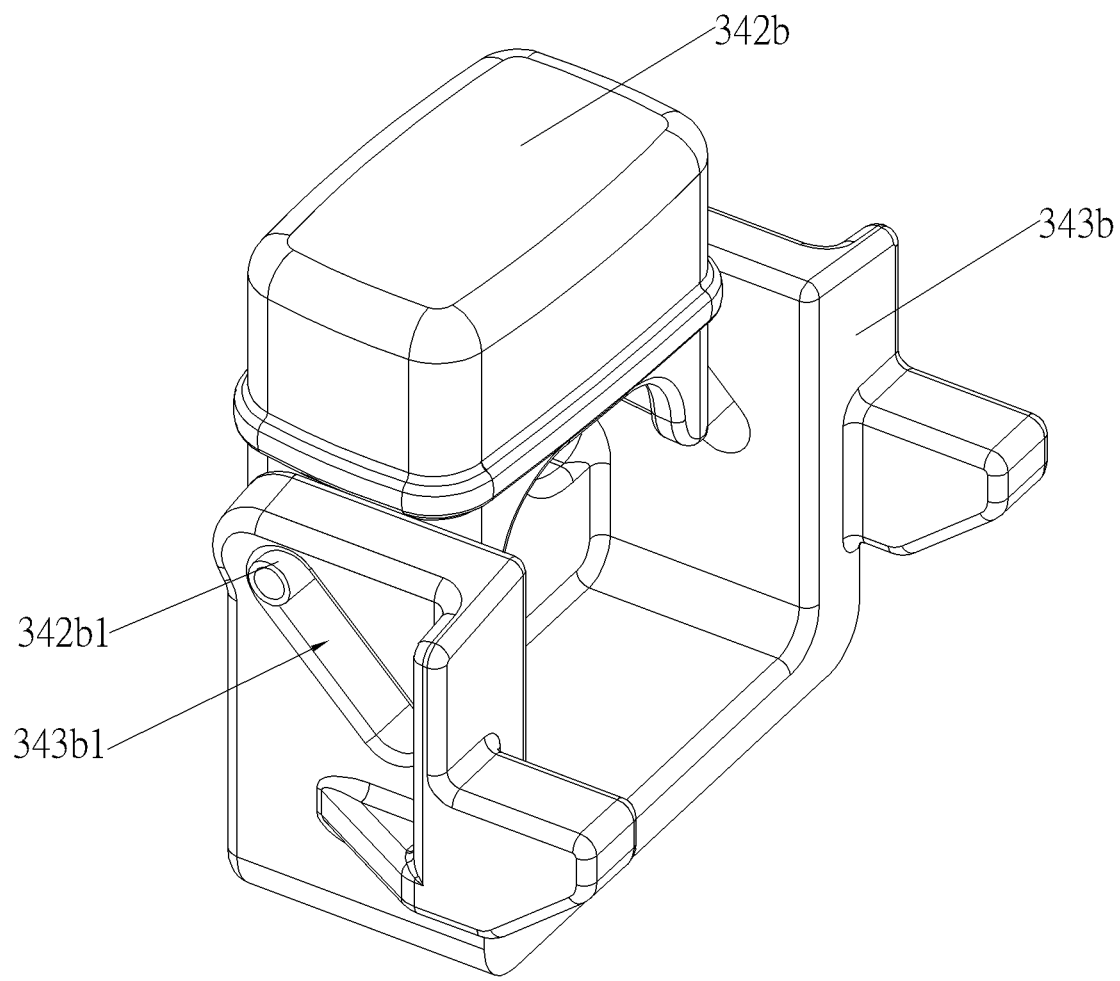
FIG. 25 is a diagram of an operating portion and a tenon portion of the supporting mechanism according to the third embodiment of the present invention.

Please refer to the third embodiment shown in FIG. 21 to FIG. 25. FIG. 21 is a schematic diagram of the supporting mechanism 300 according to a third embodiment of the present invention. FIG. 22 is an enlarged diagram of area G shown in FIG. 21 according to the third embodiment of the present invention. FIG. 23 is a cross-sectional diagram along line IV-IV in FIG. 22 according to the third embodiment of the present invention. FIG. 24 is a cross-sectional diagram along line IV-IV in FIG. 22 in an operating status according to the third embodiment of the present invention. FIG. 25 is a diagram of an operating portion 342b and a tenon portion 343b of the supporting mechanism 300 according to the third embodiment of the present invention. The third connecting component 340b of the supporting mechanism 300 according to the third embodiment is different from the connecting components of the first embodiment and the second embodiment.

The third connecting component 340b includes a third engaging portion 341b, an operating portion 342b, a tenon portion 343b and a restoring portion 344b. The third engaging portion 341b is fixed on the main body 310, a containing chamber 341b1 is disposed on a side of the third engaging portion 341b and is for the engaging structure 120 to stretch in, the tenon portion 343b is connected to the third engaging portion 341b in a retractable manner, and the operating portion 342b is slidably connected to the third engaging portion 341b and operatively connected to the tenon portion 343b, and thus drive the operating portion 342b to slide relative to the third engaging portion 341b, so that the tenon portion 343b may selectively engage with or detach from the infant carriage device 100. Specifically, a sliding chamber 341b2 is disposed in the third engaging portion 341b and communicated to the containing chamber 341b1, the tenon portion 343b is slidably disposed in the sliding chamber 341b2, an end of the tenon portion 343b stretches into the containing chamber 341b1 for engaging with the engaging structure 120. Sliding slots 343b1 are disposed on the two sides of the operating portion 342b, an extending direction of the sliding slots 343b1 and a sliding direction of the operating portion 342b are intersected. Specifically, an angle formed by the extending direction of the sliding slots 343b1 and a sliding direction of the operating portion 342b can be an acute angle or an obtuse angle. An end of the operating portion 342b stretches into the third engaging portion 341b, and the other end of the operating portion 342b is protruded out of the third engaging portion 341b for operation. Sliding sticks 342b1 are formed and protruded out of the two sides of an end of the tenon portion 343b that stretches into the third engaging portion 341b, and the sliding sticks 342b1 are slidably inserted in the sliding slots 343b1. The operating portion 342b drives the tenon portion 343b to slide in the sliding chamber 341b2 to exit from the containing chamber 341b1 by the two sliding sticks 342b1 and the sliding slots 343b1, so as to detach from the engaging structure 120. Furthermore, the restoring portion 344b resiliently contacts between the tenon portion 343b and the main body 310. When the operation on the operating portion 342b is stopped, the restoring portion 344b resiliently pushes the tenon portion 343b to slide along the sliding chamber 341b2 and drives an end of the tenon portion 343b to slide into the containing chamber 341b1, so as to engage with the engaging structure 120. The restoring portion 344b can resiliently contact between the tenon portion 343b and the third engaging portion 341b or the operating portion 342b, as long as the tenon portion 343b may continuously engage with the infant carriage device 100; thus, the restoring portion 344b can also resiliently contact the tenon portion 343b.

Specifically, as the operating portion 342b is driven by an external force to slide relative to the third engaging portion 341b, the operating portion 342b drives the tenon portion 343b to detach from the infant carriage device 100. As the external force is stopped, the restoring portion 344b can provide elastic force to drive the operating portion 342b to slide relative to the third engaging portion 341b and restore, so that the tenon portion 343b engages with the infant carriage device 100. According to this embodiment, the restoring portion 344b can be a spring, a rubber component, or a combination thereof, but not limited to this. The restoring portion 344b can be made of any elastic material.

Figure 26:
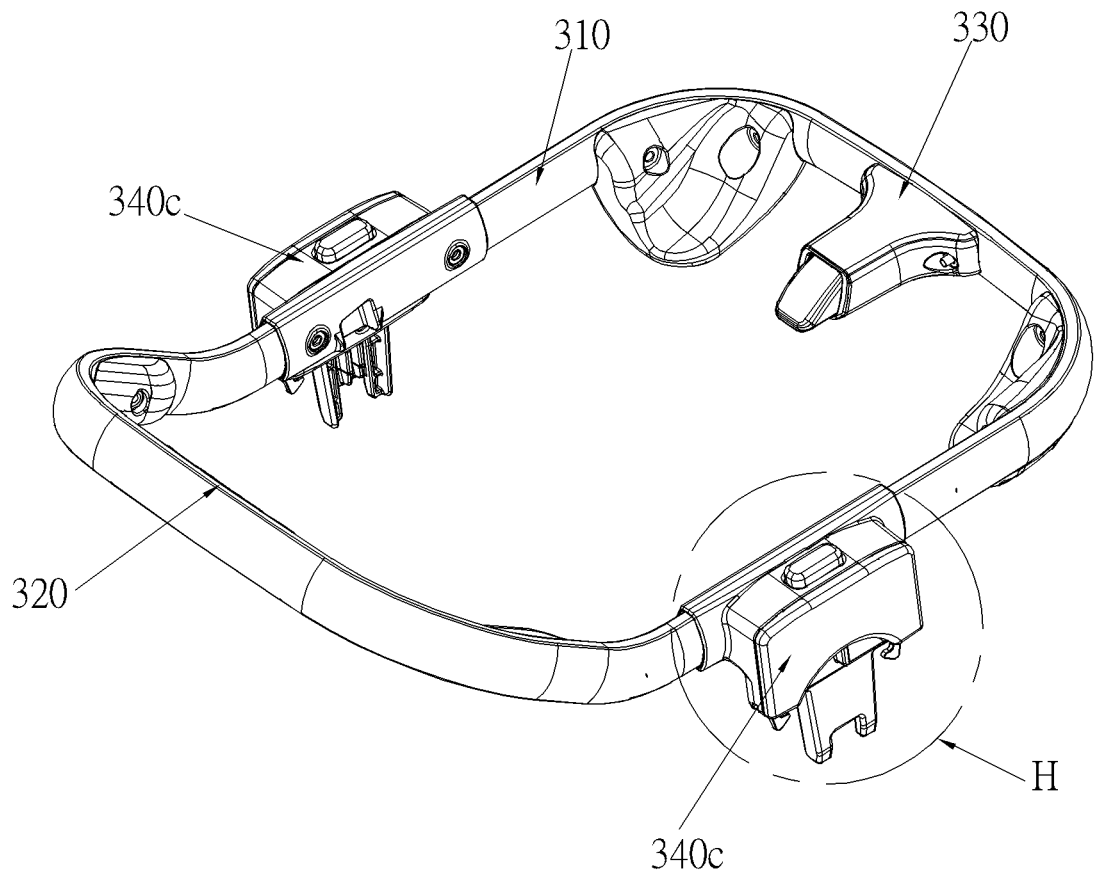
FIG. 26 is a schematic diagram of the supporting mechanism according to a fourth embodiment of the present invention.
Figure 27:
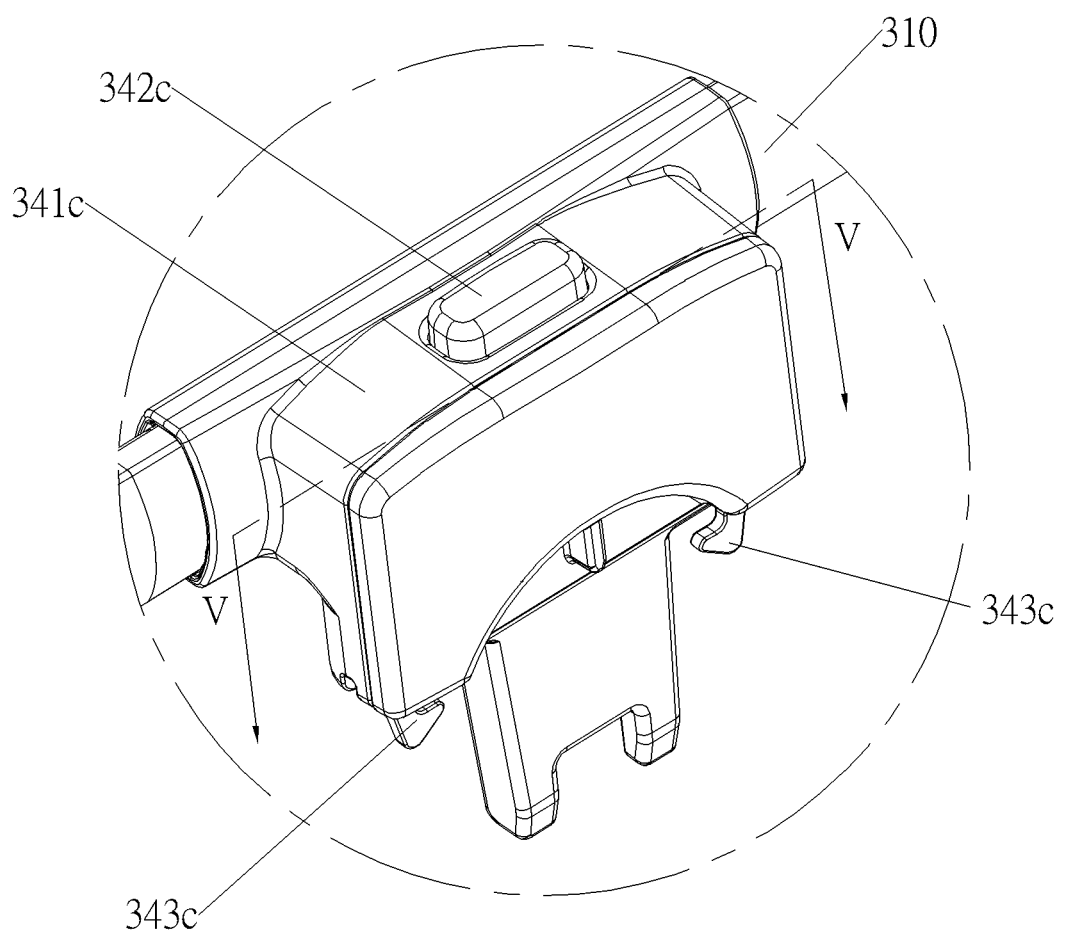
FIG. 27 is an enlarged diagram of area H shown in FIG. 26 according to the fourth embodiment of the present invention.
Figure 28:
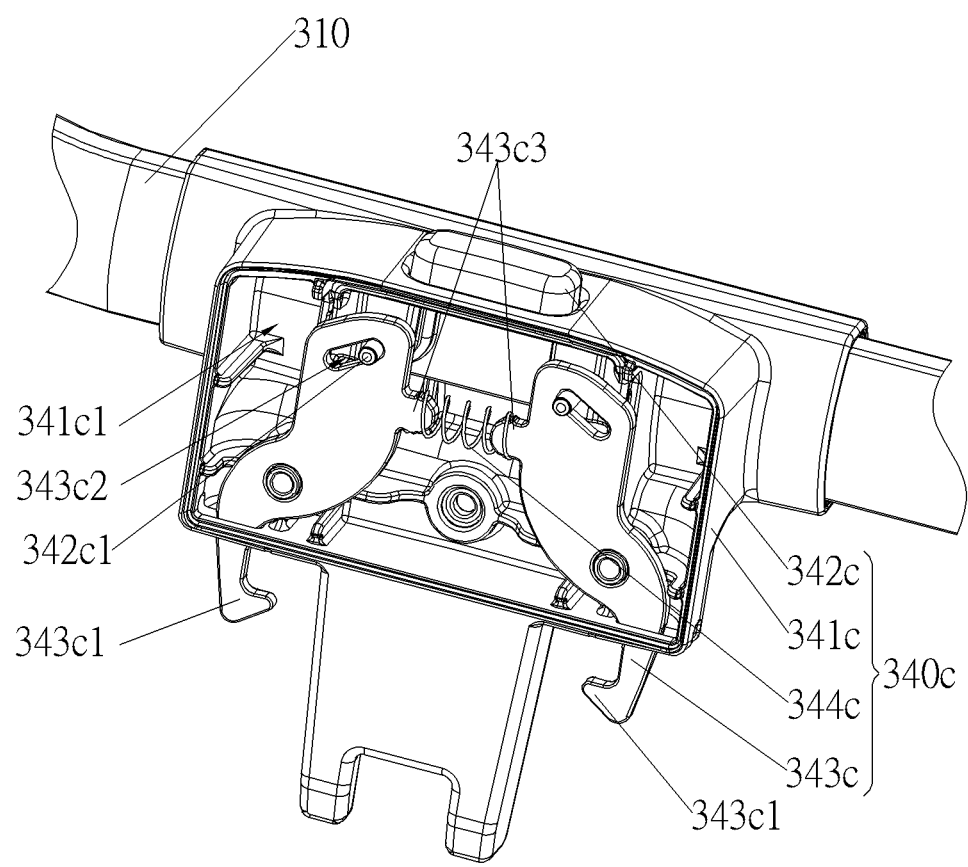
FIG. 28 is a cross-sectional diagram along line V-V in FIG. 27 according to the fourth embodiment of the present invention.
Figure 29:
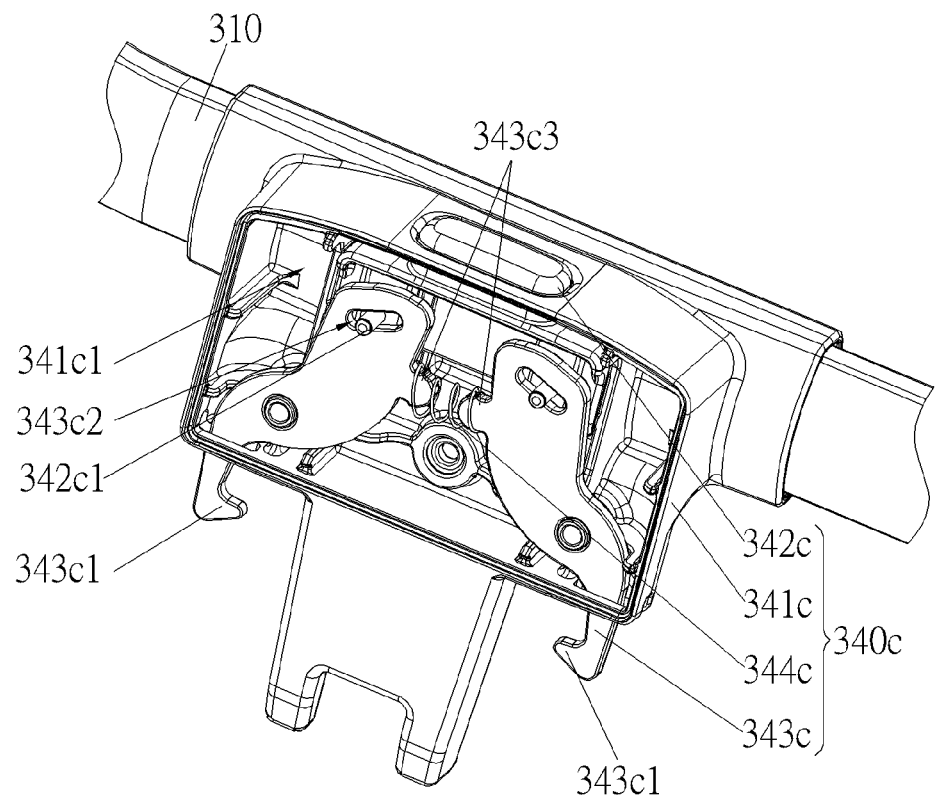
FIG. 29 is a cross-sectional diagram along line V-V in FIG. 27 in an operating status according to the fourth embodiment of the present invention.

Please refer to FIG. 26 to FIG. 29. FIG. 26 is a schematic diagram of the supporting mechanism 300 according to a fourth embodiment of the present invention. FIG. 27 is an enlarged diagram of area H shown in FIG. 26 according to the fourth embodiment of the present invention. FIG. 28 is a cross-sectional diagram along line V-V in FIG. 27 according to the fourth embodiment of the present invention. FIG. 29 is a cross-sectional diagram along line V-V in FIG. 27 in an operating status according to the fourth embodiment of the present invention. The third connecting component 340c of the supporting mechanism 300 according to the fourth embodiment is different from the connecting components of the first embodiment, the second embodiment and the third embodiment.

The third connecting component 340c includes a third engaging portion 341c, an operating portion 342c, two tenon portions 343c and a restoring portion 344c. The third engaging portion 341c is fixed on the main body 310, and the two tenon portions 343c are respectively pivoted to the third engaging portion 341c to form a clamp structure. Specifically, the two tenon portions 343c release or clamp relatively, and the operating portion 342c is slidably connected to the third engaging portion 341c and operatively connected to the two tenon portions 343c, and thus drive the two tenon portions 343c to slide relative to the third engaging portion 341c, so that the two tenon portions 343c may selectively clamp to engage with or release to detach from the infant carriage device 100. Specifically, a driving chamber 341c1 is disposed in the third engaging portion 341c. The two tenon portions 343c are respectively located in the driving chamber 341c1, a center of each tenon portion 343c is pivoted in the third engaging portion 341c, and an end of each tenon portion 343c stretches out of the driving chamber 341c1 to form a clip portion 343c1, respectively. Each of the two tenon portions 343c includes a sliding slot 343c2, respectively, and extending directions of the sliding slots 343c2 and a sliding direction of the operating portion 342c are intersected. Specifically, an angle is formed by each extending direction of the sliding slots 343c2 and the sliding direction of the operating portion 342c. An end of the operating portion 342c stretches into the driving chamber 341c1, and two sliding sticks 342c1 are formed and laterally protruded out of the stretched end of the operating portion 342c, and the two sliding sticks 342c1 are slidably inserted in the sliding slots 343c2. The operating portion 342c drives the two tenon portions 343c to come close to each other for releasing the two clip portions 343c1, so as to detach from the engaging structure 120 by the two sliding sticks 342c1 and the sliding slots 343c2. Optionally, two inclined sliding slots 343c2 are disposed on the stretched end of the operating portion 342c, and two sliding sticks are respectively formed and laterally protruded out of the two engaging portions 343c and slidably inserted in the sliding slots 343c2. The operating portion 342c drives the two tenon portions 343c to come close to each other for releasing the two clip portions 343c1, so as to detach from the engaging structure 120 by the sliding sticks 342c1 and the sliding slots 343c2.

Furthermore, two connecting protrusions 343c3 are formed on opposite inner sides of the two tenon portions 343c and protruded inwardly, the connecting protrusions 343c3 and the clip portions 343c1 are respectively disposed on two sides of the pivotal joints of the tenon portions 343c and the third engaging portion 341c. The restoring portion 344c is disposed between the two connecting protrusions 343c3 and resiliently contacts against the two tenon portions 343c. When the operating portion 342c is driven by an external force to slide relative to the third engaging portion 341c, the operating portion 342c drives the tenon portions 343c to detach from the infant carriage device 100. When the external force is stopped, the restoring portion 344c resiliently pushes the two tenon portions 343c to move away from each other, and the two clip portions 343c1 to clamp relatively, so as to engage with the engaging structure 120. In addition, the restoring portion 344c can also resiliently contact against the operating portion 342c.

By the above description, it may be seen that the supporting mechanism 300 according to the present invention has a simple structure. Also, the assembly and disassembly with the infant carriage device 100 and the infant carrier 200 is convenient. Further, the cost is lower.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting mechanism detachably disposed on an infant carriage device and for detachably supporting an infant carrier, the supporting mechanism comprising:
    a main body;
    a first connecting component fixed on the main body;
    a second connecting component, wherein a part of the second connecting component is disposed in the main body in a retractable manner, the first connecting component and the second connecting component are for detachably supporting the infant carrier cooperatively, and the first connecting component and the second connecting component are respectively disposed on the opposite sides of the main body; and
    a third connecting component, wherein a part of the third connecting component is movably disposed in the main body and detachably installed on the infant carriage device, and the third connecting component is disposed between the first connecting component and the second connecting component, wherein the third connecting component comprises a third engaging portion fixed on the main body, a tenon portion movably connected to the third engaging portion, and an operating portion connected to the tenon portion and for driving the tenon portion to selectively engage with or detach from the infant carriage device.

2. The supporting mechanism of claim 1, wherein the main body is formed as a rectangular frame.

3. The supporting mechanism of claim 1, wherein the first connecting component comprises a first engaging portion fixed on the main body, and a sunken portion connected to the first engaging portion for engaging with the infant carrier.

4. The supporting mechanism of claim 1, wherein the second connecting component comprises a second engaging portion fixed on the main body, and a pushing portion connected to the second engaging portion in a retractable manner for contacting against the infant carrier.

5. The supporting mechanism of claim 4, wherein the second connecting component further comprises a resilient portion resiliently contacting the pushing portion so that the pushing portion continuously stretches out of the second engaging portion.

6. The supporting mechanism of claim 4, wherein the pushing portion comprises a first surface for contacting against the infant carrier, and an inclined second surface adjacent to the first surface.

7. The supporting mechanism of claim 6, wherein a distance between the first surface and the second surface is decreasing in a direction of that the pushing portion stretches out of the second engaging portion.

8. The supporting mechanism of claim 1, wherein the third connecting component further comprises a restoring portion resiliently contacting the tenon portion for continuously moving the tenon portion to engage with the infant carriage device.

9. The supporting mechanism of claim 1, wherein the third connecting component further comprises a restoring portion resiliently contacting the operating portion for continuously driving the tenon portion to move to engage with the infant carriage device.

10. The supporting mechanism of claim 1, wherein the tenon portion is connected to the third engaging portion in a retractable manner.

11. The supporting mechanism of claim 10, wherein the tenon portion comprises a first side contacting against the infant carriage device, and an inclined second side adjacent to the first side.

12. The supporting mechanism of claim 11, wherein a distance between the first side and the second side is decreasing in a direction away from a junction of the main body and the third engaging portion.

13. The supporting mechanism of claim 1, wherein the tenon portion is pivotally connected to the third engaging portion.

14. The supporting mechanism of claim 13, wherein a quantity of the tenon portion is two, and the two tenon portions pivot in opposite directions.

15. The supporting mechanism of claim 14, wherein the two tenon portions form a clamp structure.

16. The supporting mechanism of claim 1, wherein the operating portion is pressed to drive the tenon portion to detach from the infant carriage device.

17. The supporting mechanism of claim 1, wherein the operating portion is released to drive the tenon portion to engage with the infant carriage device.

18. The supporting mechanism of claim 1, wherein the operating portion is slidably connected to the tenon portion.

19. The supporting mechanism of claim 18, wherein one of the operating portion and the tenon portion includes a sliding stick, and the other of the operating portion and the tenon portion includes a sliding slot in which the sliding stick is slidably inserted.

20. The supporting mechanism of claim 19, wherein an extending direction of the sliding slot and a sliding direction of the operating portion are intersected.

21. The supporting mechanism of claim 1, wherein the operating portion is pivotally connected to the tenon portion.

22. The supporting mechanism of claim 1, wherein the operating portion is slidably connected to the third engaging portion.

23. The supporting mechanism of claim 1, wherein the operating portion is pivotally connected to the third engaging portion.

24. The supporting mechanism of claim 1, wherein the operating portion is pivotally connected to the tenon portion and the third engaging portion, and a pivotal joint of the operating portion and the tenon portion is different from a pivotal joint of the operating portion and the third engaging portion.

* * * * *